(12) United States Patent
Holzschneider et al.

(10) Patent No.: US 9,946,932 B2
(45) Date of Patent: *Apr. 17, 2018

(54) SYSTEMS AND METHODS FOR IMAGE-FEATURE-BASED RECOGNITION

(71) Applicant: Geenee GmbH, Berlin (DE)

(72) Inventors: Philipp Holzschneider, Berlin (DE); Thorsten Otto Wolfgang Magers, Berlin (DE); Hannes Priehn, Berlin (DE)

(73) Assignee: Geenee GmbH, Berlin (DE)

( * ) Notice: Subject to any disclaimer, the term of this patent is extended or adjusted under 35 U.S.C. 154(b) by 234 days.

This patent is subject to a terminal disclaimer.

(21) Appl. No.: 14/968,524

(22) Filed: Dec. 14, 2015

(65) Prior Publication Data

US 2016/0110605 A1    Apr. 21, 2016

Related U.S. Application Data

(63) Continuation of application No. 14/692,234, filed on Apr. 21, 2015, now Pat. No. 9,230,172, which is a
(Continued)

(51) Int. Cl.
*G06K 9/00* (2006.01)
*G06F 17/30* (2006.01)
(Continued)

(52) U.S. Cl.
CPC ..... *G06K 9/00671* (2013.01); *G06F 17/3028* (2013.01); *G06F 17/30256* (2013.01);
(Continued)

(58) Field of Classification Search
CPC ........ G06F 17/30256; G06F 17/30047; G06K 9/00671
See application file for complete search history.

(56) References Cited

U.S. PATENT DOCUMENTS

| 7,575,171 B2 | 8/2009 | Lev |
| 7,707,218 B2 | 4/2010 | Gocht et al. |

(Continued)

FOREIGN PATENT DOCUMENTS

| CN | 101697232 A | 4/2010 |
| CN | 101710334 A | 5/2010 |

(Continued)

OTHER PUBLICATIONS

Andoni, Alexandr, and Piotr Indyk. "Near-optimal hashing algorithms for approximate nearest neighbor in high dimensions." Foundations of Computer Science, 2006. FOCS'06. 47th Annual IEEE Symposium on. IEEE, 2006.*

(Continued)

*Primary Examiner* — Stephen R Koziol
*Assistant Examiner* — Raphael Schwartz
(74) *Attorney, Agent, or Firm* — Finnegan, Henderson, Farabow, Garrett & Dunner, LLP

(57) ABSTRACT

Methods and systems are described herein that allow a user to capture a single image snapshot from video, print, or the world around him or her, and obtain additional information relating to the media itself or items of interest displayed in the snapshot. A fingerprint of the snapshot is used as a query and transmitted to the server. Image Feature-Based Recognition, as described herein, uses a feature index to identify a smaller set of candidate matches from a larger database of images based on the fingerprint. Novel methods and systems using a distance metric and a radical hash table design exploit probabilistic effects and allow distinct image features to be preferred over redundant ones, allowing only the more distinctive data points to remain resident within the index, yielding a lean index that can be quickly used in the identification process.

19 Claims, 24 Drawing Sheets

Related U.S. Application Data continuation of application No. 14/619,045, filed on Feb. 10, 2015, now Pat. No. 9,122,706.

(60) Provisional application No. 61/937,859, filed on Feb. 10, 2014.

(51) Int. Cl.
    *G06K 9/62*     (2006.01)
    *G06T 11/60*     (2006.01)

(52) U.S. Cl.
    CPC ....... *G06K 9/00013* (2013.01); *G06K 9/6215* (2013.01); *G06K 9/6232* (2013.01); *G06T 11/60* (2013.01)

(56) References Cited

U.S. PATENT DOCUMENTS

| | | |
|---|---|---|
| 7,751,805 B2 | 7/2010 | Neven et al. |
| 7,809,722 B2 | 10/2010 | Gokturk et al. |
| 8,315,423 B1 | 11/2012 | Jing et al. |
| 8,406,531 B2 | 3/2013 | Ramanujapuram et al. |
| 8,407,744 B2 | 3/2013 | Moon et al. |
| 8,483,519 B2 | 7/2013 | Frank et al. |
| 8,494,271 B2 | 7/2013 | Boncyk et al. |
| 8,503,787 B2 | 8/2013 | Boncyk et al. |
| 8,548,255 B2 | 10/2013 | Gao et al. |
| 8,644,610 B1 | 2/2014 | Ramkumar et al. |
| 8,732,030 B2 | 5/2014 | Gokturk et al. |
| 8,811,742 B2 | 8/2014 | Petrou et al. |
| 8,831,349 B2 | 9/2014 | Mei et al. |
| 8,837,868 B2 | 9/2014 | Boncyk et al. |
| 8,849,069 B2 | 9/2014 | Boncyk et al. |
| 8,849,259 B2 | 9/2014 | Rhoads et al. |
| 2005/0162523 A1 | 7/2005 | Darrell et al. |
| 2010/0318515 A1 | 12/2010 | Ramanathan et al. |
| 2011/0125735 A1 | 5/2011 | Petrou et al. |
| 2011/0258526 A1 | 10/2011 | Supakkul et al. |
| 2011/0282906 A1 | 11/2011 | Wong |
| 2012/0030553 A1 | 2/2012 | Delpha et al. |
| 2012/0224768 A1 | 9/2012 | Lee |
| 2012/0328215 A1 | 12/2012 | Thong et al. |
| 2013/0121571 A1 | 5/2013 | Gokturk et al. |
| 2013/0223744 A1 | 8/2013 | Ramanujapuram et al. |
| 2013/0260360 A1 | 10/2013 | Baurmann et al. |
| 2013/0273968 A1 | 10/2013 | Rhoads et al. |
| 2014/0032330 A1 | 1/2014 | Boncyk et al. |
| 2014/0111545 A1 | 4/2014 | Damola |
| 2014/0115439 A1 | 4/2014 | Delpha et al. |
| 2014/0164406 A1 | 6/2014 | Petrou |
| 2014/0188648 A1 | 7/2014 | Argue et al. |
| 2014/0233854 A1 | 8/2014 | Zhong et al. |
| 2014/0240523 A1 | 8/2014 | Dodla |
| 2014/0254934 A1 | 9/2014 | Laxminarayana Bhat et al. |
| 2014/0331044 A1 | 11/2014 | Fujii et al. |

FOREIGN PATENT DOCUMENTS

| | | |
|---|---|---|
| JP | 2013-254332 A | 12/2013 |
| WO | WO 2013/080365 A1 | 6/2013 |

OTHER PUBLICATIONS

Ke, Yan, et al. "Efficient near-duplicate detection and sub-image retrieval." ACM Multimedia. vol. 4. No. 1. 2004.*

Japanese Patent Application No. 2016-561703, by GeeNee GmbH: Notice of Reasons for Rejection, dated Mar. 21, 2017, with English translation (9 pages).

China Patent Application No. 201580018985.3, First Office Action dated Aug. 22, 2017.

Gao et al.; "Accurate off-line query expansion for large-scale mobile visual search"; ScienceDirect Signal Processing; vol. 93, Issue 8, Aug. 2013, pp. 2305-2315.

Rasouli, A. et al.; "Visual Saliency Improves Autonomous Visual Search"; *Computer and Robot Vision (CRV), 2014 Canadian Conference on* , vol., No., pp. 111,118, May 6-9, 2014.

Tsai et al.; "Proceedings of the Mobile Product Recognition"; Proceedings of the 18th Internal Conference on Multimedia, Oct. 25-29, 2010, Firenze, Italy.

Esmaeili et al.; "A Fast Approximate Nearest Neighbor Search Algorithm in the Hamming Space"; IEEE Transactions on Pattern Analysis and Machine Intelligence, vol. 34, Issue 12, Dec. 2012, pp. 2481-2488.

Xin et al.; "Large Visual Repository Search with Hash Collision Design Optimization"; IEEE Multimedia, vol. 20, Issue 2, Apr. 2013, pp. 62-71.

Andoni, Alexandr et al.: "Near-Optimal Hashing Algorithms for Approximate Nearest Neighbor in High Dimensions"; Communications of the ACM. Jan. 2008 / vol. 51, No. 1, pp. 117-122.

Andoni, Alexandr et al.: "Near-Optimal Hashing Algorithms for Approximate Nearest Neighbor in High Dimensions"; Proceedings of the 47th Annual IEEE Symposium on Foundations of Computer Science, 2006. (FOCS'06), pp. 459-469.

Ke, Yan et al.; "Efficient Near-duplicate Detection and Sub-image Retrieval"; Communications of the ACM MM'04, Oct. 10-16, 2004; ACM 1-58113-893-8/01/0010.

Hao, Feng et al; "A Fast Search Algorithm for a Large Fuzzy Database"; IEEE Transactions on Information Forensics and Security, vol. 3, No. 2, Jun. 2008 pp. 203-212.

International Search Report for International Application No. PCT/IB2015/000908; dated Oct. 8, 2015 (5 pgs.).

Written Opinion of the International Searching Authority for International Application No. PCT/IB2015/000908; dated Oct. 6, 2015 (8 pgs.).

Hsieh, Shang-Lin et al., "A Duplicate Image Detection Scheme using Hash Functions for Database Retrieval," *2010 IEEE International Conference on Systems Man and Cybernetics (SMC)*, Oct. 13, 2010, pp. 3487-3492.

Invitation to Respond to Written Opinion and Search Report issued by the Intellectual Property Office of Singapore for Application No. 11201606424X, dated Nov. 8, 2017 (10 pages).

Varytimidis, Christos, et al., "WαSH-ing Visual Repositories: Searching Europeana Using Local Features," *2013 18th International Conference on Digital Signal Processing (DSP)*, Jul. 1-3, 2013, pp. 1-6.

\* cited by examiner

SYSTEMS AND METHODS FOR IMAGE-FEATURE-BASED RECOGNITION

RELATED APPLICATIONS

This application is a continuation of U.S. application Ser. No. 14/692,234, filed Apr. 21, 2015, which is a continuation of U.S. application Ser. No. 14/619,045, filed Feb. 10, 2015, now U.S. Pat. No. 9,122,706, which claims priority to U.S. Provisional Patent Application No. 61/937,859, filed Feb. 10, 2014, the contents of which are hereby incorporated by reference in their entirety.

FIELD

The present disclosure relates to visual object recognition, and more specifically, to methods and systems for recognition of content and objects in digital images, and methods and systems for rapid delivery of additional content and/or information related to the recognized content objects. Methods and systems disclosed herein may also be applicable to search services and content-based image retrieval and recognition processes.

BACKGROUND

In today's world, nearly everyone has a camera-enabled mobile device with them at all times. Mobile device users have grown used to being able to use the mobile device to obtain additional information about the world around them using their mobile device. Mobile device users today will use the Internet to obtain additional information, research prices, view products before buying, and even purchase items or content. Users today want such access as quickly and efficiently as possible, with the fewest number of steps as possible.

A desire for more information can be triggered by, for example, viewing an object or scene in the world around us, something seen in print, such as a billboard, poster, or movie, or by something seen on a screen, such as a movie, TV show, website, or other digital content.

There are existing techniques for facilitating the delivery of additional information about items or content to a user's mobile device. For example, a marker, such as a one-dimensional barcode or two-dimensional QR-code, can be attached physically to a product, or can be printed next to an image of the product on a printed page, poster, or billboard. In some cases, artificially-generated patterns may be added to images. By scanning the code or artificially-generated pattern, either with a special purpose scanning device or using the camera function and an app on the user's mobile device, more information can be delivered to the user. The additional information can either be directly coded into the marker, or the information coded into the marker can be used to retrieve additional information from a database.

Technically more sophisticated is the recognition of images without the insertion of artificial markers, since not every object has, or can have, such a marker. For these cases, techniques have been developed to recognize images using a combination of object recognition algorithms and pattern matching. The Viola-Jones method, for example, as described in "The Rapid Object Detection Using a Boosted Cascade of Simple Features," by Paul Viola and Michael Jones, performs a cascade of predefined scan operations in order to assess the probability of the presence of a certain shape in the image, and a classification algorithm, such as AdaBoost, to identify the object. Using an "integral image" as a random pixel access data structure, the Viola-Jones method selects a small number of critical visual features from a larger generic set to yield a subset of classifiers, then combines classifiers progressively more complex classifiers in a "cascade" (AdaBoost) to allow background regions to be discarded and more computations on promising object-like regions to be performed. Classification methods typically have two phases, a training phase and a test phase, during which the training data may be used to identify objects. Classification methods are computationally intensive and rely on the careful pre-selection of training images. These types of object recognition methods are typically used in the detection of objects with the same shape and characteristics, such as faces, traffic signs, brand logos, and the like.

Other approaches utilize distinct attributes or features present in images for image-based detection and recognition. In these systems, characteristics are extracted from a set of training images, and then the system detects whether there are corresponding characteristics among either a set of snapshots, or between a snapshot and a training set of images. Applications of image-based detection and recognition span from panorama and image stitching, sparse 3D Reconstruction, augmented reality (e.g., Microsoft® Photosynth™, VisualSFM™, Qualcomm® Vuforia™), to image search and recognition services provided by Google® Goggles™ and Kooaba™/Vuforia™ Cloud Recognition. These image-based recognition techniques are used only to recognize objects and do not extract extra information deposited within the image. Further, existing technologies typically require the transmission of data-dense media files (such as the image itself or video and/or audio data) from a capturing device (e.g., a smartphone) to a processing server over a network, which further delays the recognition of the object. Existing methods also require that all additional information associated with the object be transmitted from a server back to the mobile device, thereby taking time and being unusable in situations where there is no network connection to the server.

There exist some methods and systems for extracting certain features from video and generating a "fingerprint" for transmitting to a content identification server for use in identifying the content. U.S. Pat. No. 8,793,274 to Yu, for example, extracts VDNA (Video DNA) fingerprints from captured contents. The '274 patent, however, is specifically concerned with extracting fingerprints from video (that is capturing a sequence of images), including from the accompanying audio.

There also have been some attempts to provide some methods and systems for automatic recognition of media content, but all have to date been unsatisfactory. Any existing methods and systems that work for stationary media do not easily adapt well to use with video. Systems that generate VDNA fingerprints are computationally intensive and use large media files that are difficult to transmit quickly over a network. Moreover, any system that uses VDNA fingerprints must be concerned with spikes in usage, because multiple accesses over the network at the same time will further exacerbate the bandwidth problem. Systems that attempt to recognize video media and objects therein must solve the problem of capturing a good usable image that contains the items of interest. Such systems must also account for the time delay that inevitably occurs between the moment when the scene that may have interested a user was displayed and the moment when the user initiates capture.

Hence, there is a need for systems and methods that require only a minimal amount of media data (such as a single image, instead of a VDNA-style fingerprint generation which requires using a series of images together with audio data) to detect or recognize an object or content, and which does not require transmission of media data over a network. Moreover, there is also a need for a system that is scalable to handle large volume of training data from the video frames, to overcome limitations that are typically associated with image recognitions using video frames as training set. Such limitations may include comparing vast amount of single images or video frames to classical image recognition domains, and huge redundancy in the training data set generated from video frames. Furthermore, there is also a need to speed up and improve the accuracy of the recognition process, especially when the image recognition is performed over a video. Lastly, there is also a need to filter out redundant queries to handle spikes in queries, to reserve precious network and computation resources.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION OF EXEMPLARY EMBODIMENTS

Figure 1A:
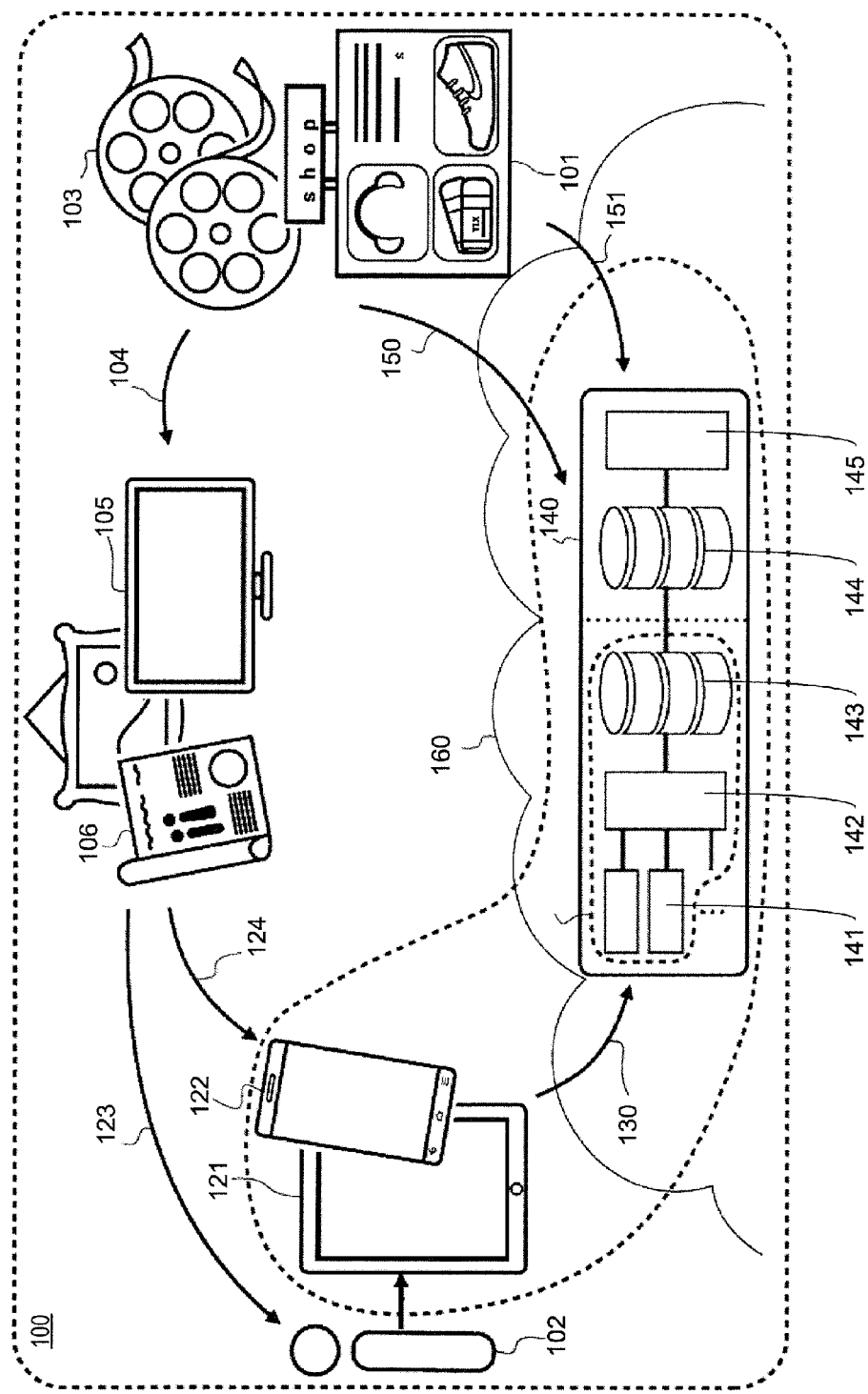
FIG. 1A is a diagram illustrating an exemplary system for providing users with additional information related to an item of interest in displayed digital content, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Methods and systems are described herein that provide users with an information rich viewing experience, by providing users with additional information about people, places, and things that they see in digital content or the world around them. The methods and systems described herein offer several advantages over prior art systems. First, methods and systems herein operate on a single image frame, whether captured from video, print, or the world around the user. The methods and systems herein may be practiced by an application operated on a user's mobile device connected to a web-based server, provided the mobile device has image capture functionality, and the server provides an image recognition service. In fact, one of the advantages of the inventions disclosed herein is that these methods and systems may be implemented using photos made with handheld consumer cameras as found in smart phones and tablets.

In methods and systems described herein, a "fingerprint" of the snapshot is extracted and used to identify additional information. Methods and systems are described herein for identifying and describing image features and generating a unique fingerprint of the single image. In addition, the original image need not be stored on the user's mobile device, as the fingerprint may be used for displaying back to the user with the additional information, if desired.

Using systems and methods described herein, retrieving additional information by identifying the media or content related to the initial snapshot in performed using the fingerprint as a query. Image Feature-Based Recognition, as described herein, uses a feature index to identify a smaller set of candidate matches from a larger database of images. Use of the feature index enables faster searches over large image sets. Existing solutions using feature indexing fail in scenarios with huge sets (hundreds of millions) image features with a great number of similarities, as typically seen in collections of single frames extracted from video material. Instead, the methods and systems described herein overcome the problems with the prior art using a distance metric and a radical hash table design exploiting probabilistic effects. The methods and systems described herein automatically sort out distinct image features over redundant ones, allowing only the more distinctive data points to remain resident within the index, yielding a lean index that can be quickly used in the identification process. In contrast, traditional Approximate Nearest-Neighbor (ANN) methods store all data points unfiltered which greatly deteriorates their matching performance.

The methods and systems described herein provide means for handling large amounts of image data while maintaining image resolution and distinctiveness. The methods and systems described herein will also handle spikes in request traffic due to high periods of use.

Further, in some embodiments described herein, additional information may be identified without performing full-scale image recognition on the mobile device. Methods and systems described herein introduce use of a stand-alone replicable layer that operates between the web-communication layer and a search system on a server to intercept and handle many of the requests. By selectively caching and identifying similar or equivalent requests at the mobile device, fewer requests need to be forwarded to the server.

The multiple inventions described herein may be implemented alone or in various combinations with one another. Each of the various inventions will be described in further detail below.

FIG. 1A is a diagram showing at a high level a system 100 for connecting content providers 101 to users 102 through visual media 103, using some or all of the inventions described herein. Content providers 101 may be, for example, producers, retailers, advertisers, media content owners, and other entities that have product or content. Visual media 103 may be, for example, a television broadcast, movie, print, or billboard. The visual media can be delivered, via distribution network 104, to a video media broadcasting platform 105 or a printed media 106.

In the system shown in FIG. 1A, a user 102 has a mobile device, such as tablet 121 or smartphone 122. The mobile device may also be, in some embodiments, a camera with a processor, memory, and wireless communication capability. In some embodiments, the mobile device comprises an accelerometer, gyroscope, or other device for detecting the orientation of the mobile device. In embodiments described herein, the mobile device is Internet-enabled. Embodiments of the mobile device will be described in more detail below with respect to FIGS. 3, 8, and 9.

In some embodiments, user 102 can consume content 123 as displayed or broadcasted on platforms 105 and 106 directly. Content 123 may also be displayed directly in the user's mobile device.

In a first step, user identifies something of interest about which he or she would like to learn more information. The thing of interest may be, for example, an item displayed in content 123 or 124, such as a product, prop, clothing, or other objects. The thing of interest could also be the location of the scene itself, or the topic depicted in the scene. In some embodiments, the thing of interest is the particular content itself, for example, the movie, video, or program that is being displayed.

Using an end-user application and the camera functionality on the user's mobile device, the user takes a snapshot of the screen depicting the thing of interest. The snapshot may be a close-up of the thing itself, or can include the surrounding area of the thing of interest. The snapshot may also comprise more than just the display device that is displaying the content and the content being displayed on the screen. In some embodiments, such as when content 121 or 122 is being displayed on the user's mobile device, the user may take a snapshot of the screen depicting the thing of interest by taking a screen capture.

Figure 1B:
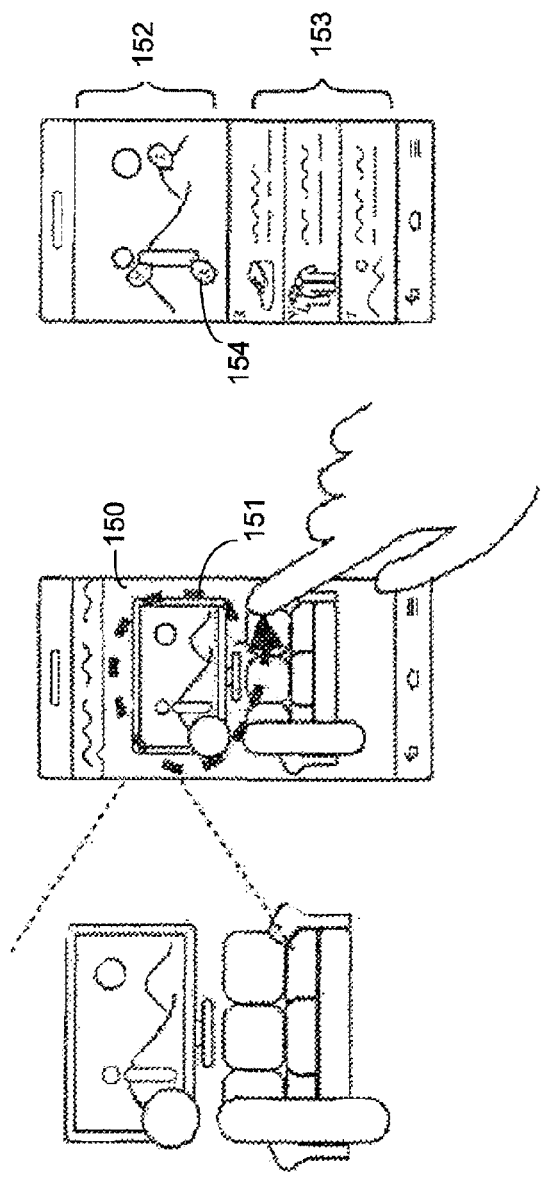
FIG. 1B illustrates use of exemplary methods and systems described herein for obtaining more information about objects or things in displayed digital content.

FIG. 1B illustrates use of exemplary methods and systems described herein for obtaining more information about objects or things in displayed digital content. As shown in FIG. 1B, the user may hold mobile devices 121 or 122 such that a large area of view (including the thing of interest) is shown on the screen. In some embodiments, the entire area of view is captured. In some embodiments, the system may automatically determine that only a certain portion of the area of view (such as the display screen showing content) is material, and only the display screen is captured. In some embodiments, the user may indicate, via interface 150, a subset of the image shown in the display by, for example, touching or circling the thing of interest with the user's finger or a stylus, as indicated by portion 151. The end-user app may then capture only portion 151 of the image in the display of the mobile device. If a portion is indicated, portion 151 of the image is then used to generate a query to be processed by an image database. The image database can then return an image 152, which is determined to be matching with at least part of portion 151, for displaying at the mobile devices.

Additional information 153 may be selected based on the captured image, and displayed to the user. The additional information 153 displayed will be information related to or associated with the media content in the snapshot. The additional information 153 may be selected based on the entire snapshot or any identified portion 151.

In some embodiments, image 152 may be displayed along with additional information 153, either above, below, or beside additional information 153. In some embodiments, image 152 may include tags 154 (also called annotations) that correlate to the additional information 154. In at least some embodiments, the tags 154 appear next to some or all of the items as depicted in image 152, for which additional information 153 has been identified. In some embodiments, tags 154 may be used by the user to navigate to parts of additional information 153 associated with the item marked by the tag. By clicking on a tag, for example, the user may be taken to the associated information on the screen which may be search results or a link to additional information. In some embodiments, the tag is itself represents a hyperlink to additional information.

Figure 1C:
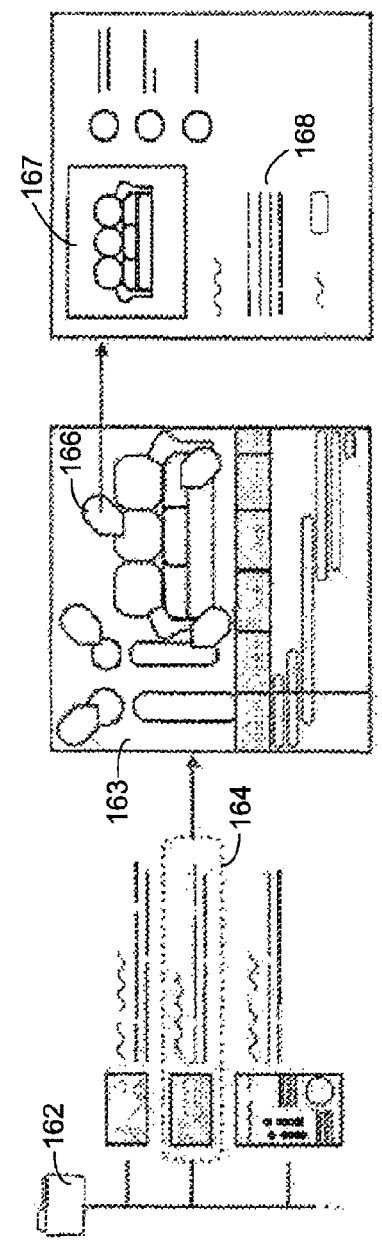
FIG. 1C illustrates use of exemplary methods and systems described herein for providing more information to users about objects or things in a digital media.

In the embodiment shown in FIG. 1C, image 163 displayed in the center has already been annotated. The diagram on the left shows a directory 162 which stores, in a hierarchy, additional information 164. Additional information 164 can be associated with a particular tag 166 pointing to an object (e.g., a sofa as illustrated in FIG. 1C), and can include information related to the object. The information can include images, text description, pricing, links to further information, etc., that are pertinent to the object, and the information is stored in a hierarchical structure under directory 162. As illustrated in FIG. 1C, after the user activates tag 166, at least part of additional information 164 is displayed. For example, image 167 of the sofa, textual description 168 of the sofa, and other information, can be displayed.

Figure 2A:
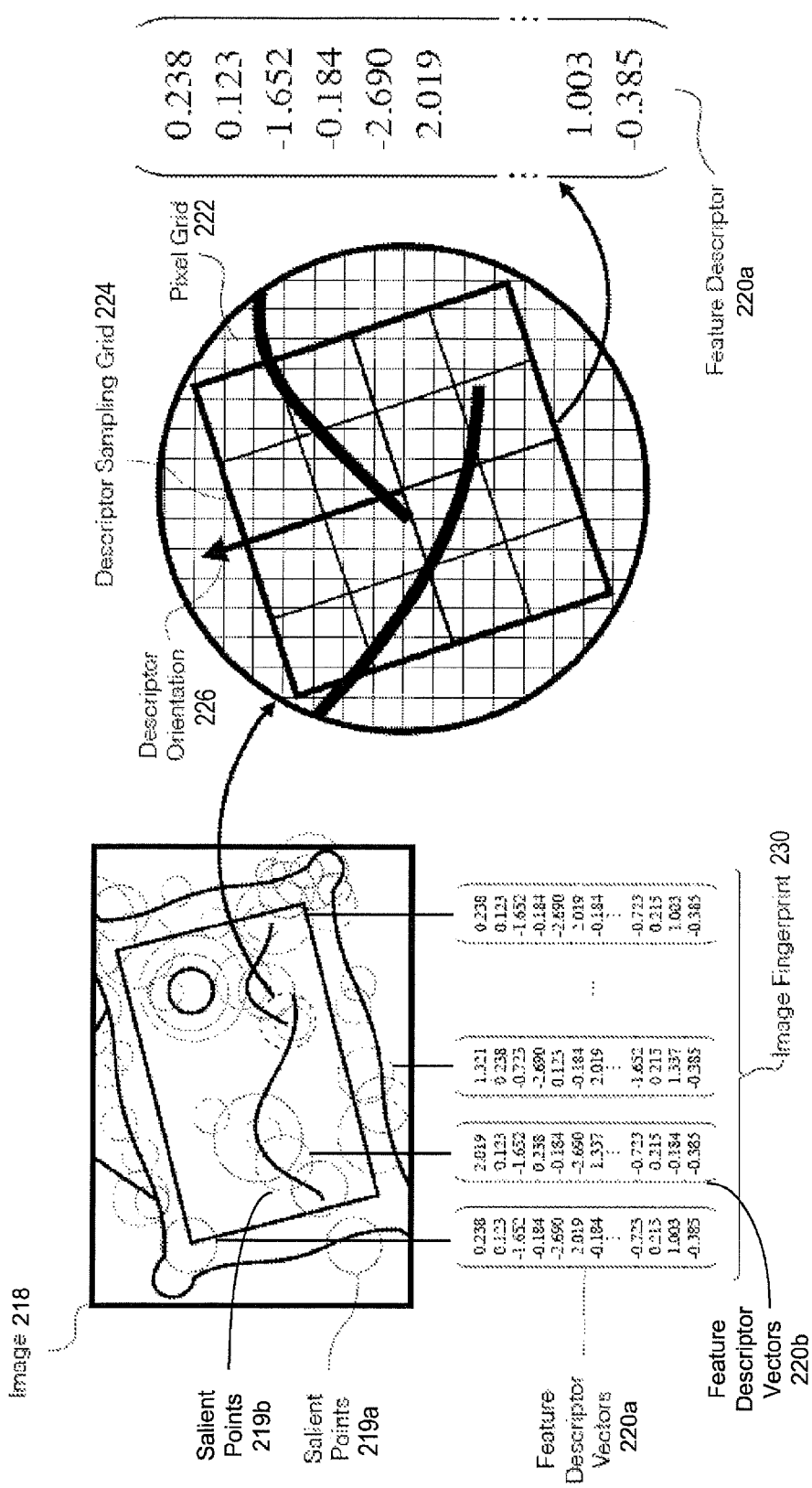
FIG. 2A illustrates the prior art process of generating from the salient points in an image a collection of feature descriptor vectors to be assembled as image fingerprints.

Returning now to FIG. 1A, after the user takes a snapshot, the end-user app generates a fingerprint of the snapshot or the indicated portion of the snapshot. There exist many known methods for generating a fingerprint of an image. Generally, as a first step, these methods detect salient points in the image using a salient point detection algorithm, such as Features from Accelerated Segment Test (FAST), Harris, Maximally stable extremal regions (MSER), etc., or the equivalent. The salient points can then be used, as shown in FIG. 2A, to generate feature descriptor vectors. As shown in FIG. 2A, salient points 219a and 219b of an image 218 can be represented respectively by vectors 220a and 220b. Scale-invariant feature transform (SIFT), Speeded Up Robust Features (SURF), Binary Robust Invariant Scalable Keypoint (BRISK), Fast Retina Keypoint (FREAK), are examples of known methods for generating feature descriptor vectors. Feature descriptor vectors can be a fixed-size vector of floating point numbers or bits that characterize the pixel patch (e.g., a 64-dimensional or 128-dimensional floating point vector, or a 512-dimension bit vector.) The vector can be generated by sampling the pixel patches, arranged within the image according to pixel grid 222, within a descriptor sampling grid 224, and the vector values can be chosen such that a distance between two vectors representing two pixel patches correlates with a degree of similarity (e.g., in luminance/brightness) between the two pixel patches.

Figure 2B:
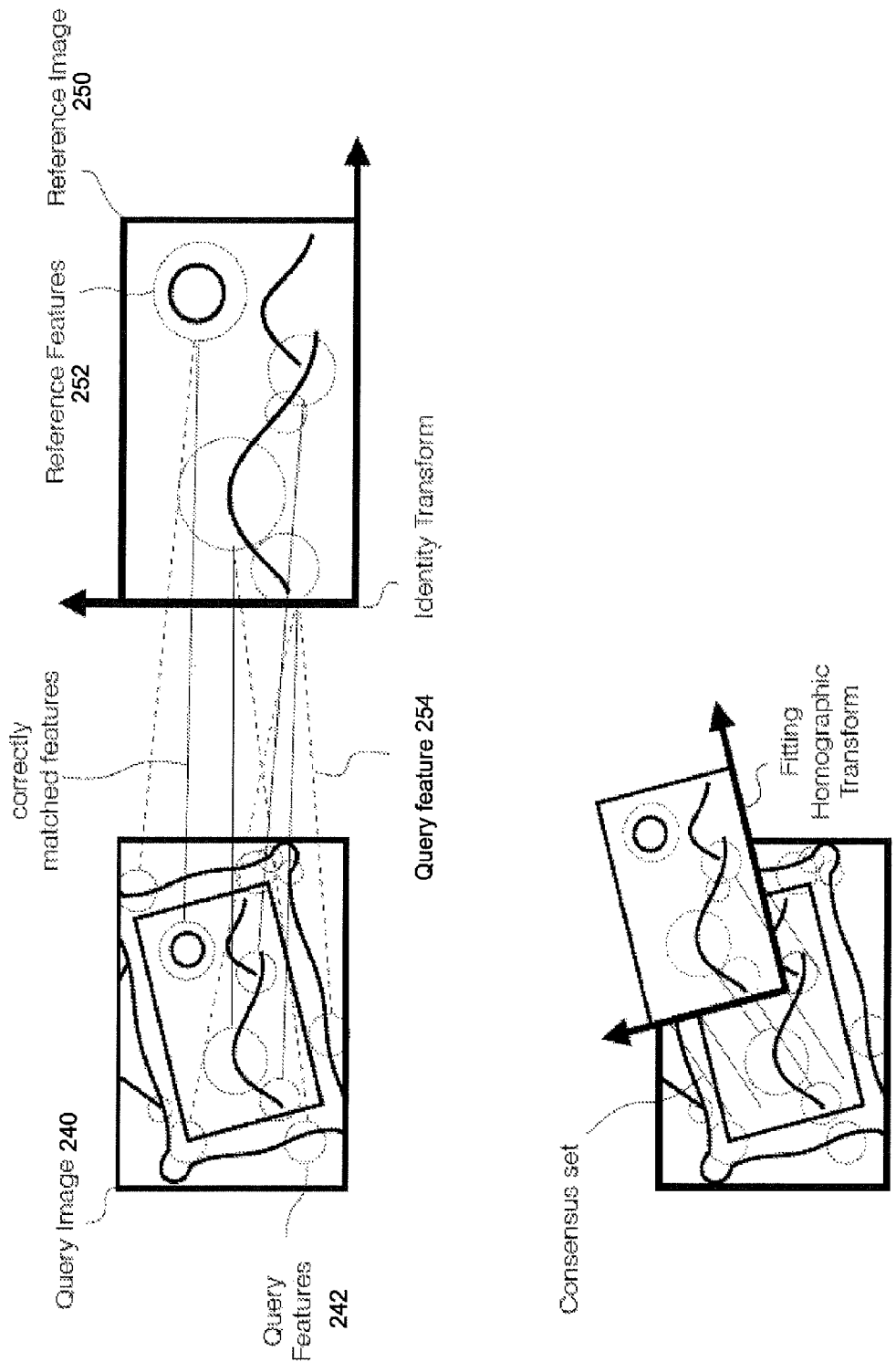
FIG. 2B are diagrams illustrating prior art methods for finding a fitting transform that matches the corresponding feature locations of the query image and the reference image.

As shown in FIG. 2B, the image content can be differently oriented as compared to corresponding content in the reference image, and matches can still be found. For example, query features 242 of query image 240 may be found to match with query features 252 of reference image 250. The relative pose (or orientation) of the image content 240 can then be derived from a set of relationships between the locations of each of query features 242 within query image 240, and the locations of the corresponding reference features 252 within reference image 250. The set of relationships can be represented as a transformation matrix. In some embodiments, the transformation matrix can be calculated iteratively to transform the locations of the features of reference image 250, until the transformed locations of the features of the reference image fit with the locations of the at least some of the features of query image 240. For each iteration of transformation matrix calculation, the validity of the transformation matrix can be checked by determining whether there is a fit for a consensus set of corresponding features between the reference image (for which the feature locations has been transform with the transformation matrix) and the query image (for which the feature locations are not transformed). In some embodiments, the transformation matrix can be calculated using least squares approximation. As discussed later with respect to the inventive methods described in FIGS. 4A and 4B, the determination of pose can be performed at either the mobile device or at the server.

A combination of feature descriptors can then be used to represent one or more visual features included in a query image, which are graphically rendered in a combination of pixel patches corresponding to the feature descriptors. The combination of feature descriptors can also be used to identify, with a certain degree of certainty, a reference image including the features descriptors. The identification of the reference image can be based on a relationship between the feature descriptors associated with the reference image and the feature descriptors extracted from (and associated with) the query image and included in the fingerprint. The relationship between the feature descriptors can determine the likelihood of success of the identification.

The fingerprint is a digital representation of certain features extracted from the snapshot. The fingerprint can include (or be generated based on) a set of feature descriptors tailored for the purpose of the query. The feature descriptors to be included in the generation of the image fingerprint can be selected by the user. The end-user application can then detect salient points within the image portion 151, and generate the feature descriptors accordingly. When the user does not make a selection, the end-user application may detect salient points from the entirety of the snapshot, and generate fingerprints associated with the detected salient points accordingly. In some embodiments, the user can further select a particular object in an image via a tapping action on interface 150, and the end-user application can prioritize the transmission of fingerprints associated the selected object.

Referring back to FIG. 1A, after a fingerprint of the snapshot image is obtained or generated, the fingerprint is used to obtain additional information. In at least one embodiment, the fingerprint is transmitted to a server 140 via communications link 130. The fingerprint may be transmitted wirelessly to the server via a wireless link, or via another communications link.

Server 140 may comprise, for example, one or more replicable query caches 141, an image matching module 142, and an Image Feature Index database 143. These components, within the dashed circle, may also be referred to as the Geenee search system.

Replicable query caches 141 can function as an entry point to the Geenee Search System. Replicable query caches 141 can receive query fingerprints directly from mobile devices. Before forwarding an incoming query fingerprint to the image matching module 142, the incoming query fingerprint is compared to the fingerprints previously received. If a match is found, a prior response to the previously-received fingerprints (e.g., a set of candidate images, or a matching image, or no matching images, etc.) can be returned. If the incoming query fingerprint does not match with the previously-received fingerprints, the incoming query fingerprint can then be forwarded to image matching module 142.

In some embodiments, image matching module 142 receives the incoming query fingerprint directly. Image matching module 142 forwards the query fingerprint to Image Feature Index database 143, and further processed. From the further processing, a set of candidate images (or fingerprint references to those images) is identified and returned to the image matching module 142. Annotations database 144 stores a set of reference images, from which the candidate images are to be identified, and a mapping between the set of reference images and the feature descriptors representing features included in the reference images. For reference images that are annotated, annotation database 144 also stores a mapping between the annotation and additional information associated with the annotation.

After receiving the candidate image fingerprints from Image Feature Index database 143, the image matching module 142 then compares the fingerprints of the candidate images to the query fingerprint (or portion thereof), and determines if there is a match. If there is a match, it then retrieves the matching image along with annotations attached to it from the annotations database 144, and returns this as a result.

As will be described in more detail below, Image Feature Index database 143 provides a searchable index for feature descriptors extracted from reference images provided previously to the annotations database. Various embodiments of Image-Feature-Index-based search consistent with the present disclosure are described below with respect to, for example, FIGS. 6A-6E.

Server 140 may also comprise a content provider interface 145. The content provider interface 145 may be implemented as a web service. Content providers may use the content provider interface to provide media material (and additional annotations to be attached thereon) intended to be included to Geenee Search. At least part of the media material, and the additional annotations, can then be stored at annotations database 144.

It should be understood that server 140 could be one server or a collection of servers. In some embodiments, server 140 can include a plurality of servers coupled together to form a cloud 160. Further, although Image Feature Index 143 and annotations database 144 are shown as residing on server 140, they can also reside in other storage areas accessible to server 140. In some embodiments, content provider interface 145 is a cloud-based application.

As an illustrative example, referring back to FIG. 1B, the user chooses a particular scene of a TV show, being broadcasted on a TV, and takes a snapshot of it, to include the particular scene in the query, which is then transmitted to server 140. Within server 140, the query can yield a set of candidate images including a reference image of the particular scene, if feature descriptors associated with the screenshot are also stored in Image Feature Index database 143. The Image Matching module 140 detects a matching image among the candidate images, and can return the matching image, or an indication of no matching image, as a response to the user's query. Additional information associated with the matching candidate image can also be retrieved from annotation database 144. In some embodiments, the user can further select an object in the snapshot via tapping to limit the scope of query to the feature descriptors associated with the object. The user can also select an object in the matching image, returned by server 140 in response to a query, to acquire other additional information.

Image Feature-Based Recognition on the Mobile Device

Figure 3:
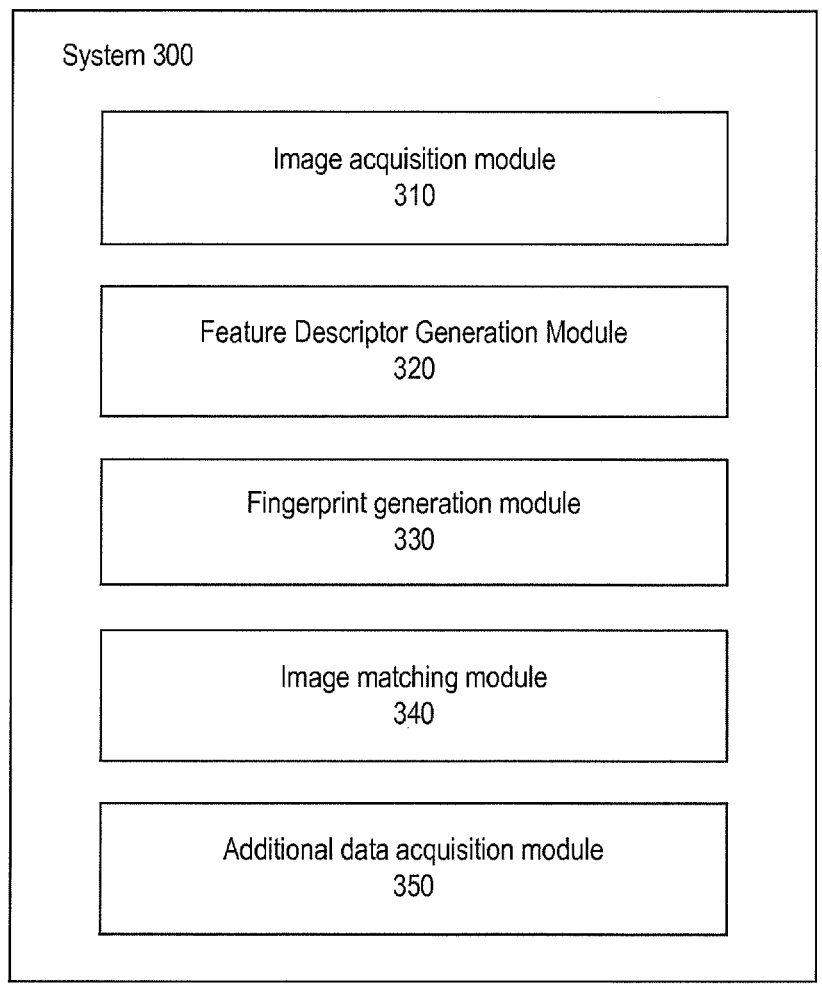
FIG. 3 is a block diagram illustrating an exemplary system for obtaining additional information on an object of interest in an image snapshot, consistent with embodiments of the present disclosure.
Figure 9:
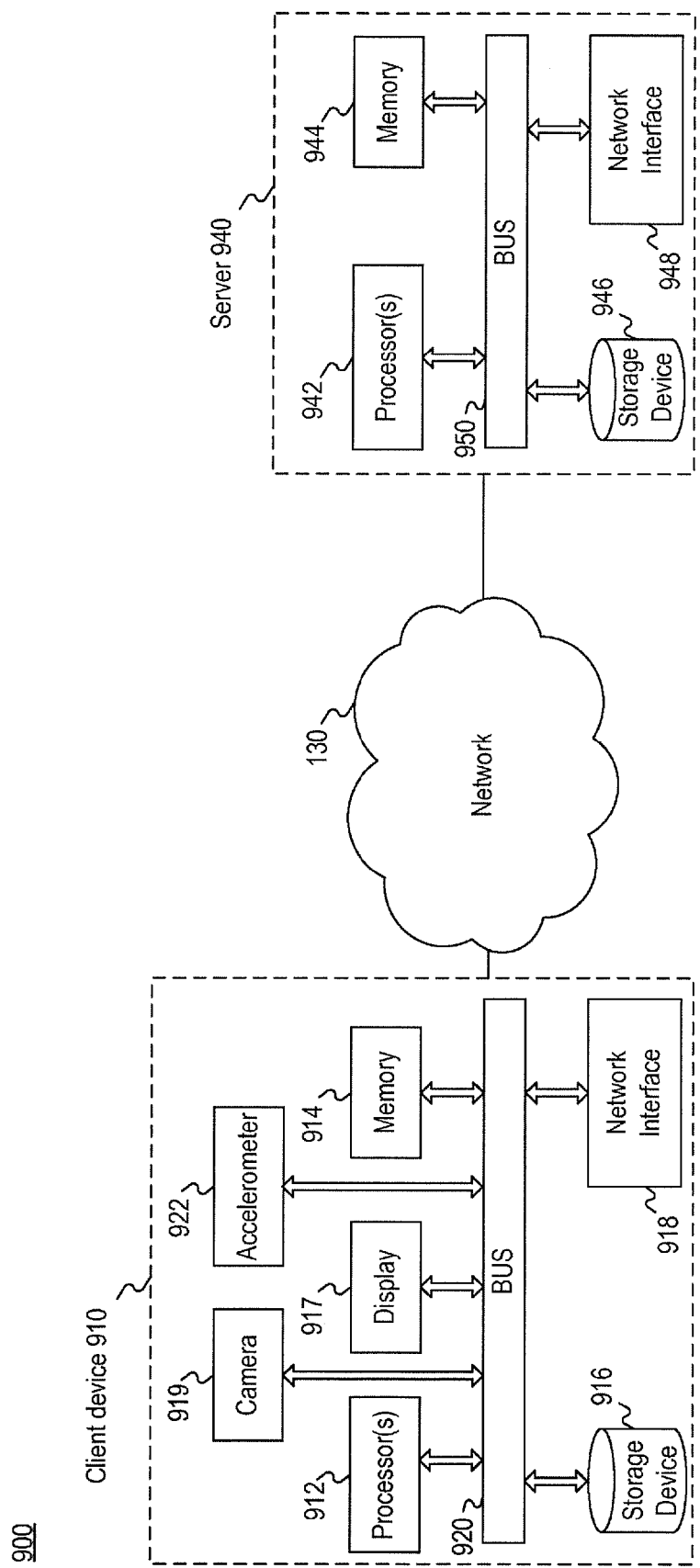
FIG. 9 is a block diagram illustrating an exemplary system on which embodiments of the present disclosure can be implemented.

FIG. 3 is a block diagram illustrating an exemplary system for obtaining additional information on an object of interest in an image snapshot, consistent with embodiments of the present disclosure. System 300 may be, for example, a mobile device comprising at least one processor, memory, communication hardware and software, and a camera. In some embodiments, system 300 is a client device 910 as shown in FIG. 9. As system 300 may be operated by a user attempting to obtain additional information on an object of interest, system 300 may also be referred to as a user's mobile device. FIG. 3 illustrates various modules, which may be implemented in hardware or software, that may be present on system 300, consistent with methods and systems described herein. As shown in FIG. 3, system 300 includes an image acquisition module 310, a feature descriptor generation module 320, a fingerprint generation module 330, and an additional data acquisition module 340.

Image acquisition module 310 acquires data representing a first image or "snapshot". The snapshot may be captured by, for example, a camera, or camera functionality of a smartphone or tablet. In some embodiments, a snapshot of the entire scene visible to the camera is taken and stored. In some embodiments, a user may indicate one or more portions of the scene visible on the display, and only the indicated portions are stored. Image acquisition module 310 can also acquire image data from other sources (e.g., from a local or remote data storage device). The first image data is transmitted to feature descriptor generation module 320 for further processing.

Feature descriptor generation module 320 can extract one or more features based on the pixel values represented by the first image data, and can generate numerical representation of the extracted features. In some embodiments, feature descriptor generation module 320 detects and locates salient points within the selected one or more portions of the first image, and generates feature descriptors to represent the salient points. Methods and systems for detecting and locating salient points, and generating feature descriptor vectors therefrom, are described above.

Fingerprint generation module 330 generates an image fingerprint based on the feature descriptor vectors generated by feature descriptor generation module 220. The fingerprint can include (or be generated based on) a set of feature descriptors based on salient points detected in a portion of the captured image (or a specific depicted object) selected by the user, or salient points detected in the entirety of the captured image.

After the fingerprint is generated, the fingerprint is used to acquire additional information by additional data acquisition module 340. In some embodiments, the fingerprint is transmitted to another system (e.g., system 700 as to be described in FIG. 7 or server 940 of FIG. 9) over a network to be used in identifying additional information. The process of searching for and identifying additional information based on the fingerprint will be described in more detail below with respect to, for example, FIG. 4A.

In some embodiments, the processing of the query includes determining, with a certain degree of certainty, that the feature descriptors of the query image match with the feature descriptors of a candidate image. Based on this determination, the processor of the query can then identify the media content (e.g. an image depicting a scene of a TV show, an image of a published advertisement, etc.) being depicted in the query image. Details about the processing of the query will be described later in, for example, FIG. 6A-6E.

After the querying with the fingerprint is processed, additional data acquisition module 340 can acquire additional data based on the result of the query. For example, based on the query, a second image including the object represented by the fingerprint in the query is located, with a certain degree of certainty, and additional data acquisition module 340 can acquire the second image for displaying. The second image can include additional information associated with the object that is not depicted in the first image (e.g., a different viewpoint, a different background, additional items now depicted in the first image, etc.). Moreover, additional data related to the object can also be acquired by additional data acquisition module 340. Referring back to the illustrative example described earlier in FIGS. 1B-C, after a query including the feature descriptors of the sofa is processed, a sofa of a specific brand and model is identified from the query, and the brand and model information can be acquired by additional data acquisition module 340 and displayed to the user. Moreover, as a result of the identification, other information, such as the price, the vendors who are selling the sofa, etc., can also be acquired by additional data acquisition module 340 and displayed to the user.

Image-Feature-Based Search

For a given query image, Image-Feature-Based Search finds matches within a large collection of images (training set) by comparing the pre-extracted image features of the training set with those extracted from the query image. In order to keep these costly per-image comparisons at a minimum, an additional search data structure is used to preselect a coarse candidate set efficiently. This search data structure, called the Image Feature Index, allows a similarity search (e.g., approximate nearest neighbor (ANN) lookup) to be performed, where a given query image feature data point can be mapped to its closest corresponding data points of a training set of images. The images associated with these data points will be retrieved as a set of candidate images. As will be described later, the Image Feature Index provides a mapping table capable of indexing/addressing feature data points. Such a mapping table can be a hash table, and the relationship between the address and the feature data points can be defined according to a hash function.

Figure 4A:
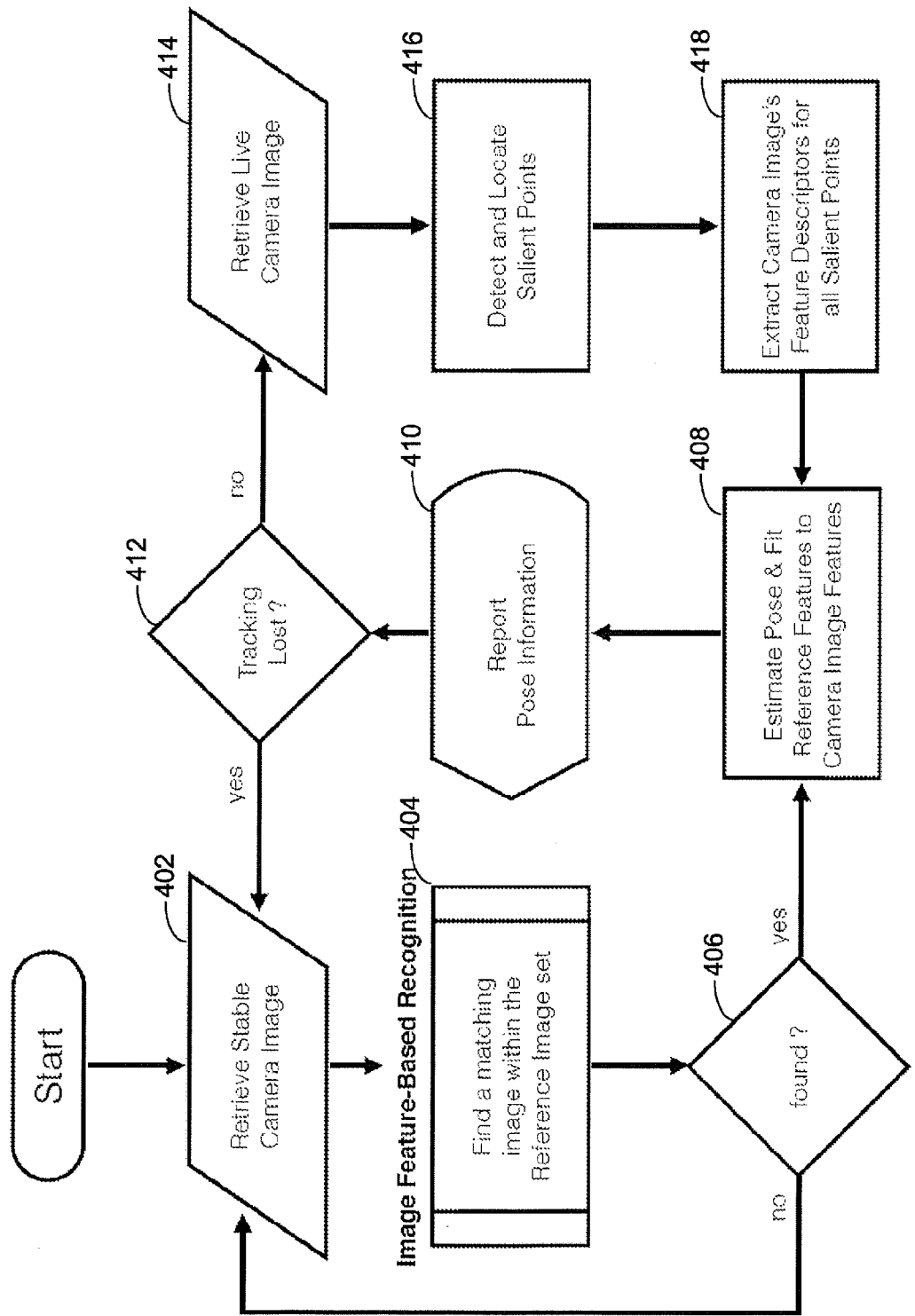
FIG. 4A is a flow chart illustrating an exemplary method for querying an Image Feature Index database to process a live camera video feed as input, consistent with embodiments of the present disclosure.

Reference is now made to FIG. 4A, which is a flow chart illustrating an exemplary method for performing image feature-based recognition from video, without the user taking a snapshot, consistent with embodiments of the present disclosure. In step 402, a stable camera image (i.e., objects appear to be stationary) is captured by the user's mobile device. In some embodiments, the mobile device may determine that an image is stable when it detects little or no movement using, for example, an accelerometer sensor of the mobile phone or other device that detects movement. After detecting little or no movement, the mobile device may capture one or more images. In some embodiments, where multiple images are captured, the mobile device may determine which of the multiple images is the most stable image, and use the most stable image as the query image.

In some embodiments, particularly those in which a user is taking a snapshot of video, there may be a delay between what is displayed on the screen and when the snapshot is taken after the user initiates the taking of the snapshot. Often, because time has elapsed, the captured snapshot no longer contains the items or scene of interest. In some embodiments described herein, an image taken some amount of time (e.g. one second) prior to the snapshot being taken is used as the query image.

In step 404, the query image is used to find a matching image within the reference image set. Feature descriptors are extracted from the salient points detected in the query image, and a fingerprint is generated from the extracted feature descriptors. The fingerprint is then transmitted to a server, where image feature-based recognition is performed to find a set of candidate images, from which a matching image can be found.

If a matching image cannot be found, in step 406, meaning that no further analysis can be carried out for that particular camera image, step 402 is re-executed to acquire a different stable image.

If a matching image is found in step 406, step 408 can then be executed, at the mobile device. In step 408, the pose of the query image can be estimated. The estimation of pose and fit can also be part of the determination about whether a query image and a reference image match, as to be described in FIG. 4B. After determining that the two images fit, the pose information may be transmitted to the mobile device in step 410. In some embodiments, the pose information may be displayed at the mobile device.

In step 412, the system determines if tracking is lost. Tracking can be determined based on, for example, whether a substantial change in pose is detected. In some embodiments, steps 402 through 412 can be used to first train the system to identify and track things of interest (as indicated by the user or through other means). A tracking can be lost when, for example, the person who operates the mobile device shifts the shooting direction substantially, or a new object that has not been identified before appears in the video.

Once the system is capable of tracking the thing of interest, step 414 can be executed to start processing live camera images, from which salient points can be detected and located in step 416, and feature descriptors are generated in step 418. The feature descriptors can then be used to estimate the pose again in step 408.

With such the arrangement as shown in FIG. 4A, content that has already be identified before may not need to be queried again. Therefore, the number of accesses to the image feature database (either located remotely or local to the device that generates the query) can be reduced. This is especially useful when a mobile device is used to generate query from a live video, when it is expected that images of the same object with identical features are captured repeatedly. Performance may be improved by not having to query the Image Feature database repeatedly for identical features.

In this case, the mobile device can act as a gatekeeper to determine whether a tracking is lost (e.g., via steps 406 through 412), and access the database only when the tracking is lost (e.g., the person who operates the camcorder shifts the shooting direction substantially, or a new object that has not be identified before appears in the video).

Figure 4B:
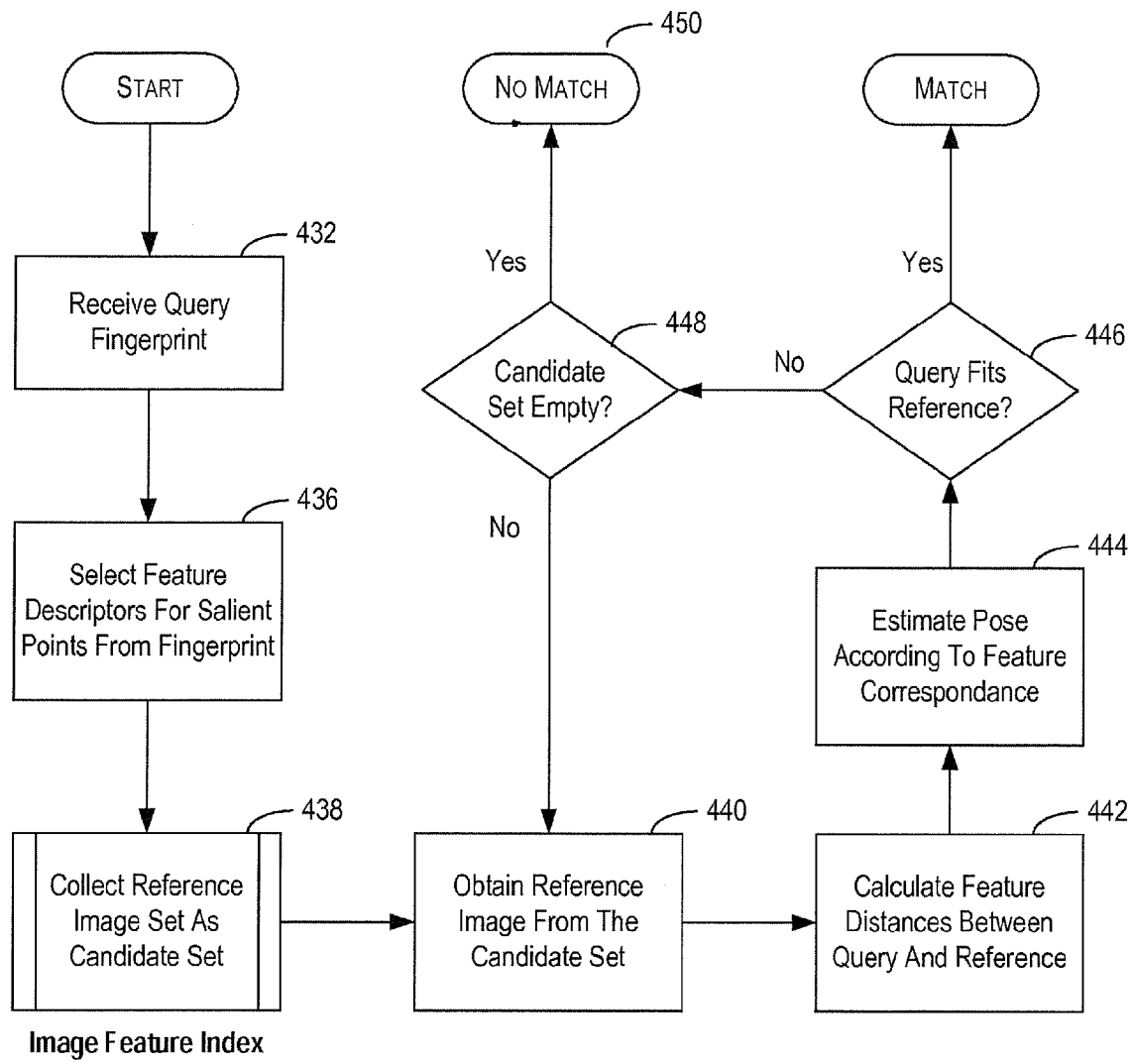
FIG. 4B is a flow chart illustrating an exemplary method for processing the result of querying the Image Feature Index database to find matching image, consistent with embodiments of the present disclosure.

Reference is now made to FIG. 4B, which illustrates an exemplary method for determining whether a candidate image matches with a query image, as described herein. In step 432, a query including an image fingerprint is received. In step 436, one or more feature descriptor vectors for the salient points of the query image are obtained from the fingerprint. In step 438, the Image Feature Index database is queried, and a set of candidate image's fingerprints are obtained based on the feature descriptors in the query. In some embodiments, the candidate images are stored in a database (e.g. annotations database 144 of FIG. 1A). The reference images may be stored along with corresponding fingerprints and annotations. In some embodiments, the reference images and annotations are provided by the content providers.

Steps 440-448 illustrate a loop that compares all candidates with the query image by using the direct matching comparison technique as shown in, for example, FIG. 2B, and can be part of step 404 of FIG. 4A. In step 440, a reference image is obtained from the set of candidate images, and may then be removed from the set. In step 442, feature distances between the query image and the reference image are calculated. These feature distances may be used to identify the corresponding features between the query image and the reference image. The feature distances may be expressed, for example, using Euclidean distance in the feature space. In such an example, for M features in a query image and N features in a reference image, the result may be an M×N Matrix of Euclidean distances. Typically only a certain percentage (e.g., 20%) of the closest features is accepted as a "correspondence". In step 444, based on the identified corresponding features, a pose (e.g., orientation) of the reference image relative to the query image can be estimated, in a similar manner as described in FIG. 2B. The query image and the reference image are then compared in step 446, taking into account any difference in the poses of the query image content and the reference image content, to determine whether the query image matches the reference image. In some embodiments, step 446 is executed in a similar manner as described in FIG. 2B, where a homographic transformation is applied to the reference image, and then a determination is made whether at least part of the query image, including the consensus set of features, fit into the transformed reference image, from which it is determined whether the two images match. If it is determined that the two images do not match, step 448 will be executed to determine whether there are any images left in the set of candidate images. If there are remaining candidate images, steps 440, 442, 444, 446, and 448 will be repeated for the next reference image, until no more images are left in the candidate set. If none of the reference images in the candidate set matches with the query image, it will be concluded that there is no match, and an appropriate indication will be returned to the mobile device in step 450.

Figure 4C:
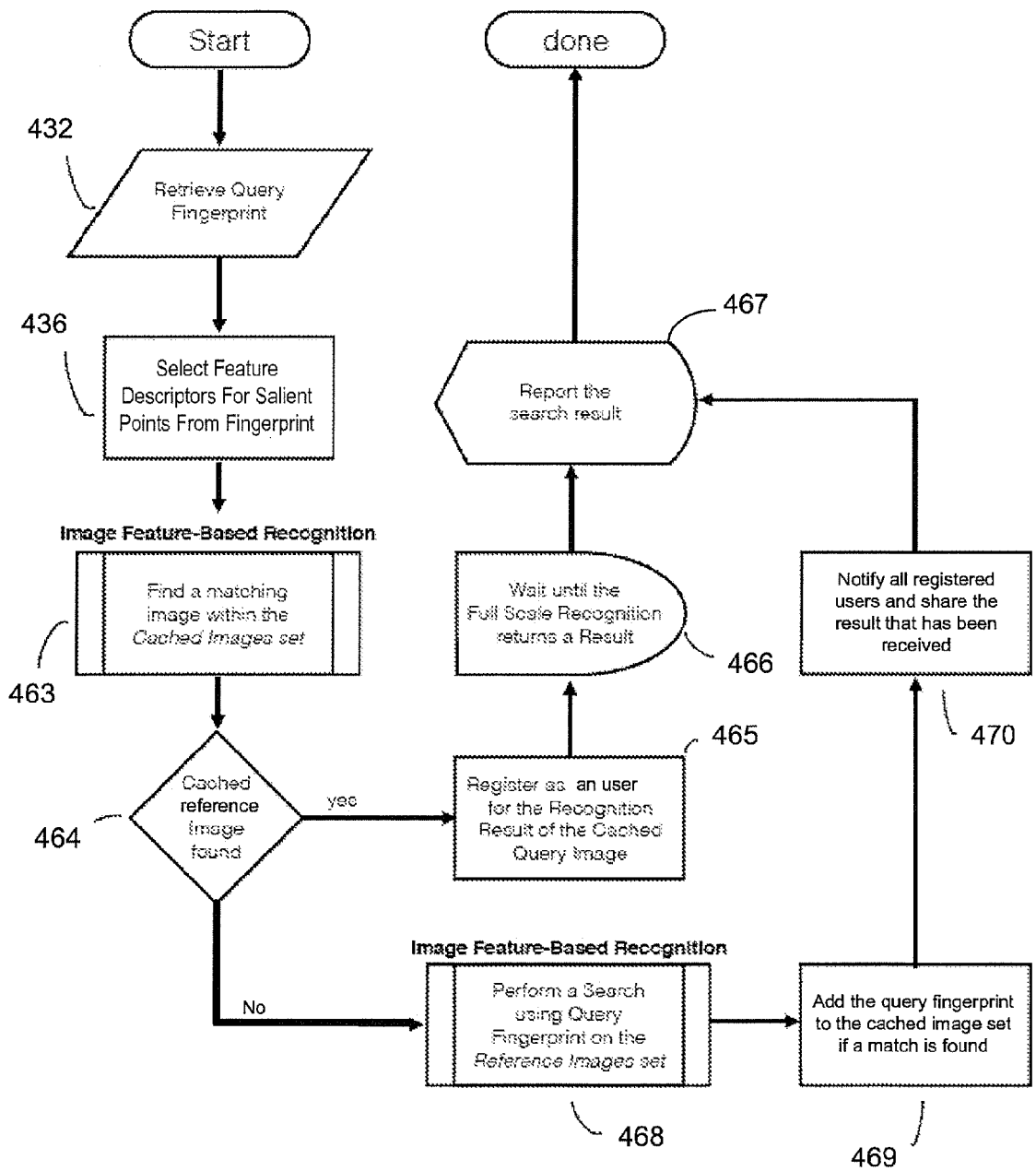
FIG. 4C is a flow chart illustrating an exemplary method for querying a cached image set before querying the image feature index database to find matching image, consistent with embodiments of the present disclosure.

FIG. 4C is a flow chart illustrating exemplary method for querying a cached image set before querying the image feature index database to find matching image, consistent with embodiments of the present disclosure. In some embodiments, reference images that have been found to match a query can be deposited in a cached image set database. In some embodiments, the method of FIG. 4C can be implemented by replicable query caches 141 of FIG. 1A. A two-tier search can be performed by first searching the cached image set database. As the cached image set database is typically much smaller than the full reference image database, the search requires less time and fewer computational resources. In some embodiments, the cached image set database can also be organized in the same way as the reference image database (e.g. employing image feature index), but on a smaller scale. In some embodiments, the cached image set database can also store a mapping between a previously-received query fingerprint and its corresponding matching reference image. The cached query can also be associated with multiple users. When multiple identical queries (e.g., queries including the same fingerprint) are received from different users, only one of the query is processed (either by performing a search at the cached image set database, or at the reference image database), and other users who submit the same query can be forwarded with the search result.

As shown in FIG. 4C, a query fingerprint is retrieved in step 432, and feature descriptors are selected from the fingerprint in step 436. Steps 432 and 436 are the same as FIG. 4B and their description is not repeated. The selected feature descriptors can be then used to search the cached image set database in step 463. The search can be done based on performing a search for the current query feature descriptors within the cached image set, or by comparing the current query fingerprints with previous-received query fingerprint.

In some embodiments, if a cached query image is found in step 464, the user (or the mobile device associated with the user) can be registered and associated with the cache hit, in step 465. As described before, associating the user with a history of cache hits can be useful in refining the cache access policy. And then step 466 can be executed, where the retrieved reference image is compared with the query image to determine if they are matching, similar to steps 440 through 448 of FIG. 4B. The search result can be reported in step 467, following which additional information can be provided to the user based on the search result.

On the other hand, if no cached query image is found in step 464, the query fingerprint will then be submitted to query the reference image database in step 468. In step 469, if a match is found, the query fingerprint can be added to the cached image set database and be associated with the matching reference image found in step 468. In some embodiments, the search result can also be broadcasted to other users, in step 470. The broadcasting can be useful in discouraging other users from submitting the same query to the system.

Image Feature Index

A key feature of the novel image feature-based recognition methods and systems described herein is the image feature index. The methods and systems described trade in compensable loss in video frame accuracy for lossy probabilistic data management, enabling drastically lowered computational costs and storage requirements in conjunction with automatic pruning of less distinctive image content. Such methods and systems are particularly suitable for managing reference image data generated from videos.

Figure 5A:
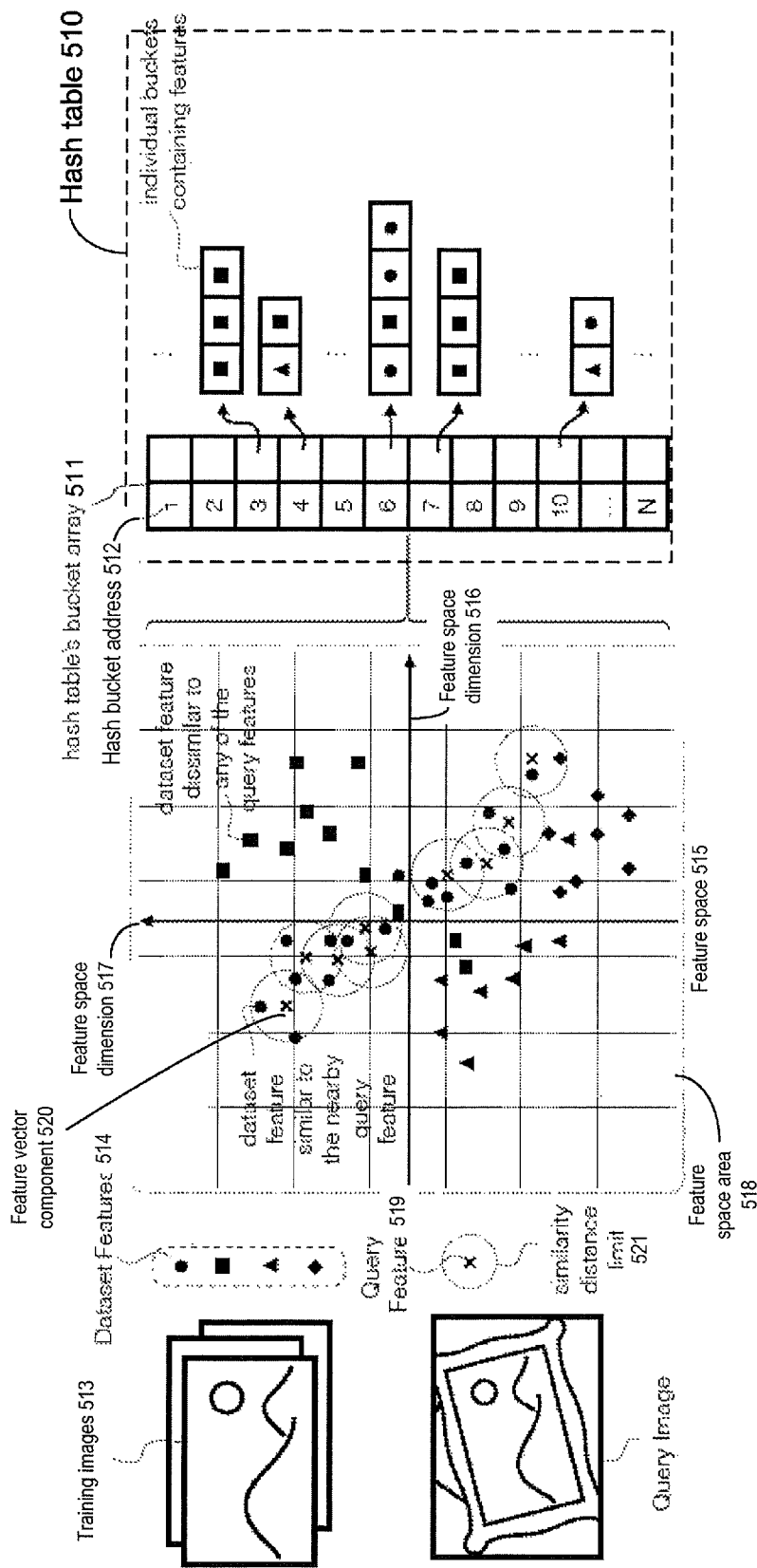
FIGS. 5A-5H are diagrams illustrating prior art methods for querying, organizing and accessing the image feature index database.

To understand the new methods and systems described herein, the following is a description of prior art systems. FIG. 5A-5H illustrate the problems associated with known methods for using hash tables. In FIG. 5A, hash table 510 is used to organize feature descriptors associated with a set of training images, from which candidate images may be selected. Hash table 510 include a bucket array 512, where each bucket address is associated, via hash functions, with one or more segments of the feature space. Each bucket can then store references to features (e.g. features 514) that reside geometrically within the bucket-associated space segment. Each hash bucket can have an unlimited number of slots, and can contain an unlimited number of feature references. Hash buckets are associated with feature descriptors (and vector components thereof) based on a relationship between the feature descriptors, determined from the location of the feature vector component within the feature space, the hash address associated with the feature space segment, and the hash bucket associated with that address. In some cases, one or more hash functions are applied to the feature descriptor vector, and the output of the hash functions can be used to determine which addresses (and which hash buckets) the feature descriptor should be associated with.

In some cases, hash functions are used to partition a feature space 515, which is the name given to a collection of features which can be represented by a set of feature descriptors. When the feature descriptors are expressed as vectors, a feature descriptor vector will have a component in each of the dimension. The hash functions can then partition the vector space (representing the feature space) into one or more areas (e.g., feature space area 518), where each area can have a collection of feature vector components representing dataset features 514, and each area can be associated with a hash bucket address. Each feature vector is then mapped by the hash functions into the hash buckets, and vectors meeting certain criteria (e.g., representing similar features) may be mapped into the same area (and hence mapped to the same hash bucket).

That way, Locality sensitive hashing (LSH) can be used to perform the similarity search, in which hash table 510 is associated with a family of hash functions which can associate, with high probability, similar data points (e.g., vectors constituting similar feature descriptors) with the same hash buckets. Locality Sensitivity refers to the fact that the probability of association between data points increases steadily for increasing similarity between the data points. As shown in FIG. 5A, for a given query feature 519, the feature descriptor corresponding to the feature 519 can include a set of vector components 520 (denoted by "x") along each vector dimension. For each vector component 520, an approximate k-nearest neighbor search (ANN) can be performed by selecting data points that share the same hash bucket membership with the query vector component, and that are also within a similarity distance limit 521 of the query vector component. Those data points can then be ranked according to, for example, a distance between a feature descriptor vector including those data points as vector components, and the feature descriptor representing the query features. A matching determination can be made based on the ranking (e.g., shortest distance).

Figure 5B:
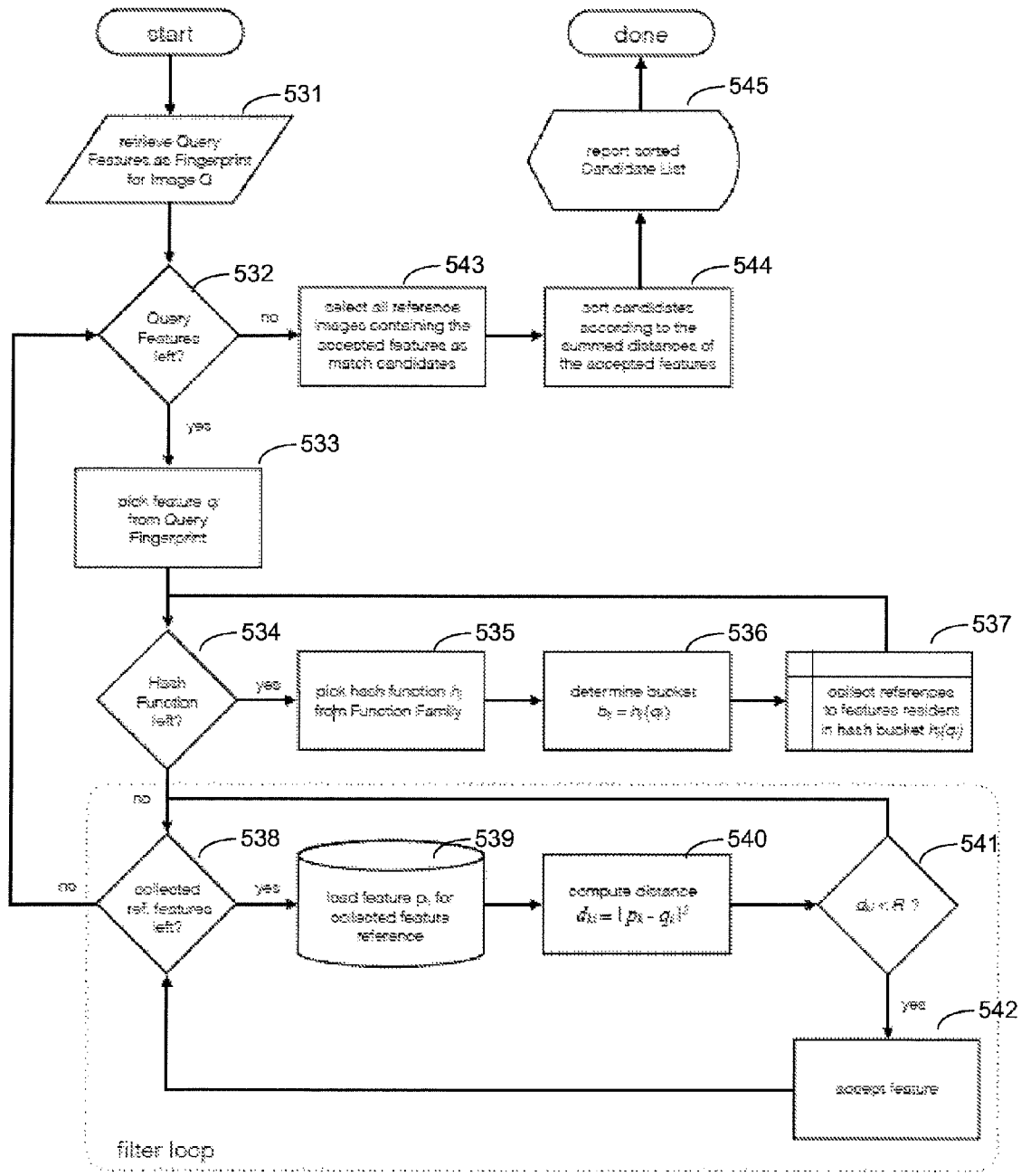

FIG. 5B illustrates a prior art method 530 for performing the query process to an image feature index database as described before. In step 531, feature descriptors included in a query fingerprint are extracted and stored in a data structure (e.g., a list), for looping through the individual features. Steps 534 through 537 are executed to perform a first round of feature descriptor retrieval from the image feature index database in response to the query. As described before, a family of hash functions is used to partition the feature sample space. Therefore, each hash function in the family is retrieved in step 535 (after checking there is unused hash function left in step 534), and then the retrieve function is used to generate an address to a bucket based on a particular query feature descriptor in step 535. The reference feature descriptor data points stored in the addressed bucket is then collected in step 536. Steps 534 through 537 are repeated until all hash functions in the family has been used, as determined in step 534.

After the reference feature descriptor data points are collected, they will be filtered via steps 538 through 542, where a distance is computed between each collected reference feature descriptor data point and the query feature descriptor data point in step 540 and compared with a certain distance R in step 541, and only those reference feature descriptors that within distance R will be accepted in step 542. Steps 538 through 542 are repeated until all reference data points collected from steps 534 through 537 are analyzed.

After all the query features have been analyzed, reference images containing the accepted features will be collected as candidate images in step 543. The candidate images are then sorted according to, for example, a summed distance (from the query feature descriptors) of the all the accepted reference feature descriptors, in step 544, and the sorted list is reported in step 545. Based on the sorted list, it can then be determined which candidate image to use for further processing.

Figure 5C:
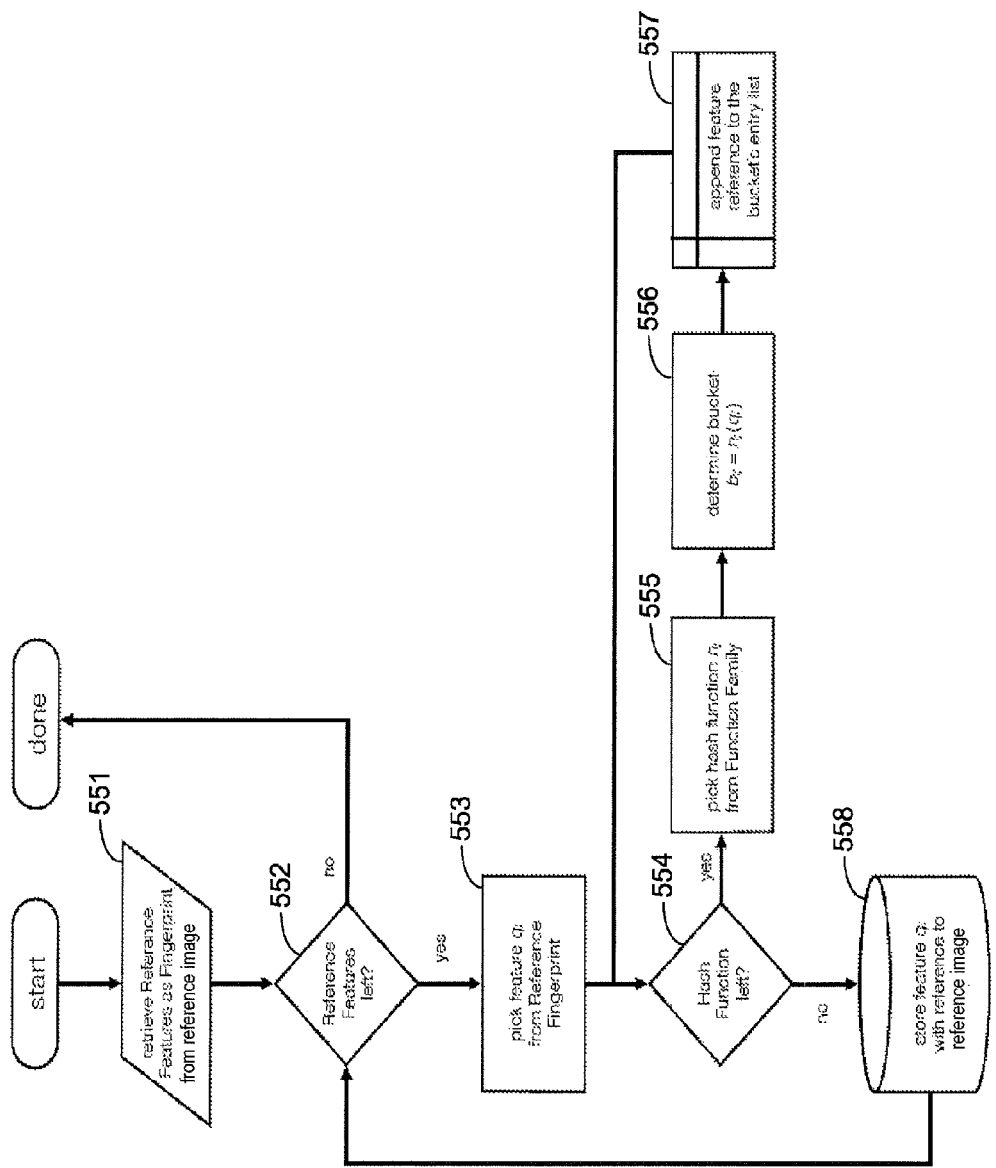

FIG. 5C illustrates a prior art method 550 for inserting a reference image into an image feature index database as described before. In step 551, reference features are extracted from a reference image. In some embodiments, the reference features (represented by feature descriptors) are identified directly from a fingerprint associated with the reference image. The extracted features will then be selected, one at a time, in step 553. The selected feature descriptor will then be input to a family of hash functions, where each hash function of the family will be picked, in step 555, to calculate a bucket address from the selected feature descriptor, in step 556. The reference feature descriptor will then be added to the bucket, by appending the feature descriptor data point to an entry list of the bucket, in step 557. After all the hash functions have been used to calculate the address for the selected feature descriptor, in step 554, the next extracted feature descriptor will be selected for processing in step 553, until all of the extracted feature descriptors are processed, as determined in step 552. Feature vectors will also be stored as hash keys associated with the reference image in step 558.

Figure 5D:
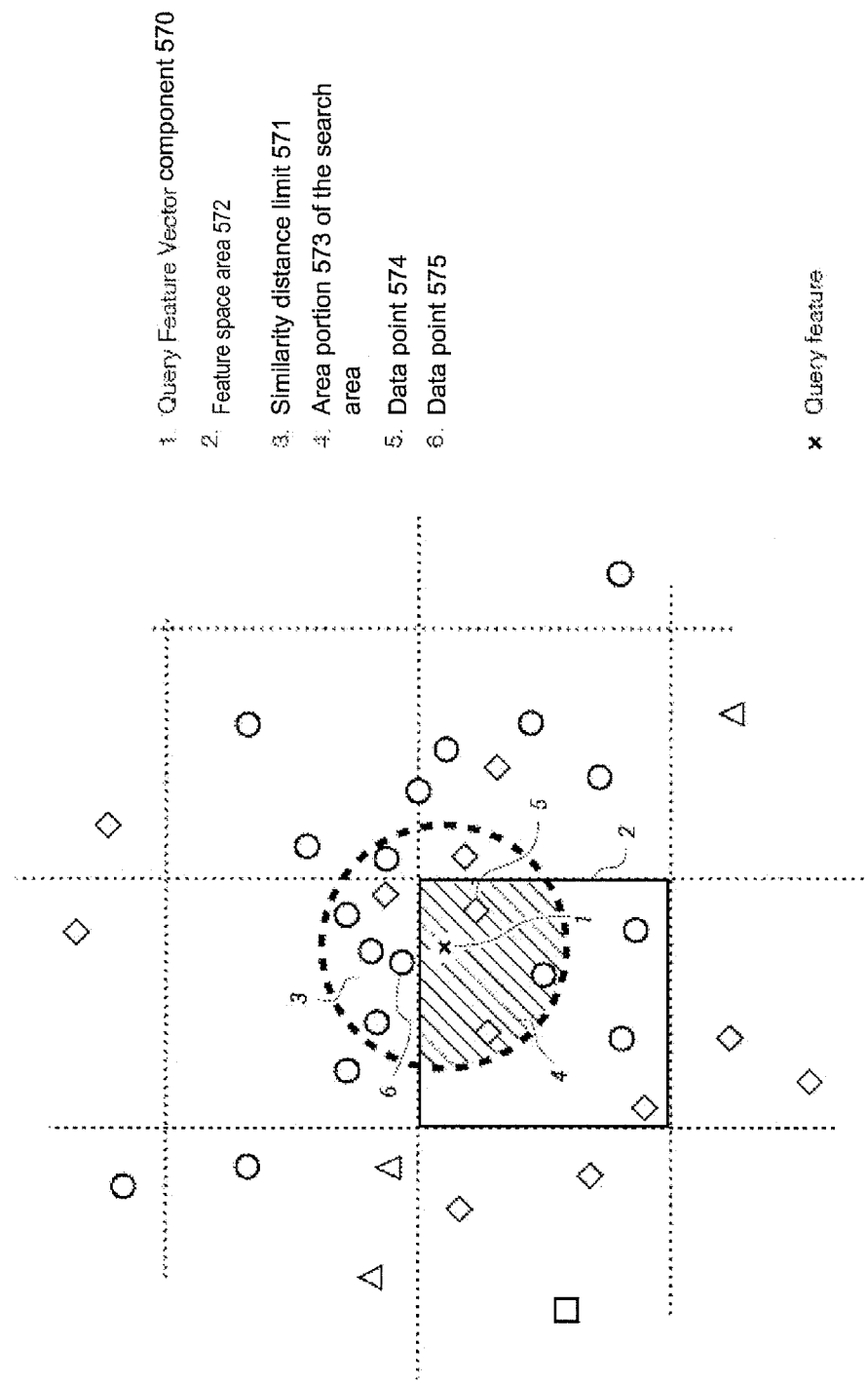
Figure 5E:
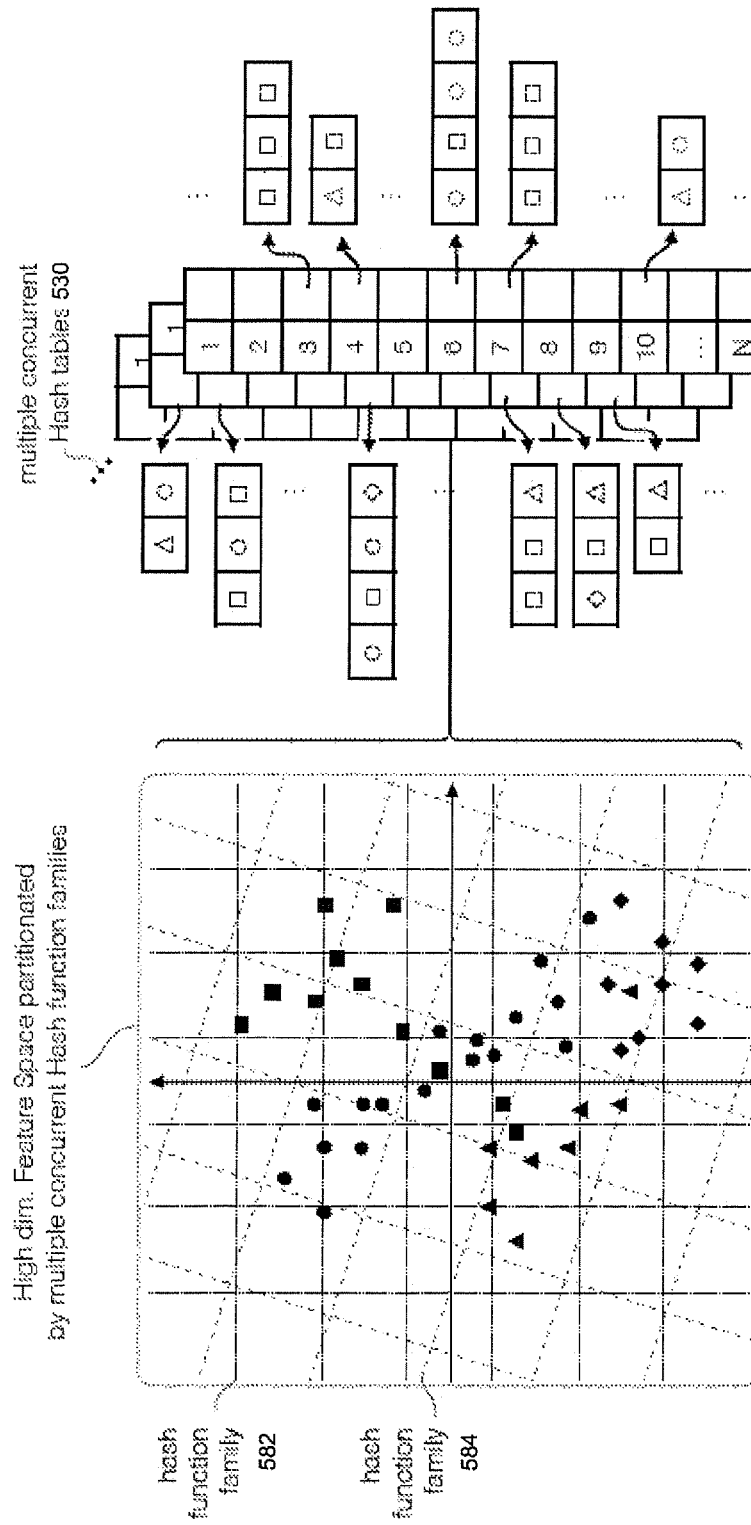

One potential drawback with the method described in FIGS. 5A-5B is that the selected bucket may not provide good coverage of feature data points that similar to the query data points. For example, as shown in FIG. 5D, query feature vector component 570 is mapped to feature space area 572. Within the similarity distance limit 571, only area portion 573, which is within the same feature space area as query feature vector component 570, will be searched. Data point 574, being also within area portion 573, is found to be the apparent nearest neighbor to query feature vector component 570. However, data point 575 is the one that has the shortest distance from query feature vector component 570, but is not selected because it belongs to a different feature space area. Data point 575 will be found if the search extends to adjacent buckets (and adjacent feature space area), but such an arrangement can be very computation intensive since the number of adjacent buckets grows exponentially for increasing dimensionality. Therefore, other than extending the search to adjacent buckets, it is desirable to further improve the likelihood that similar data points are associated with the same bucket, thus improving accuracy of the search One known technique to further improve the likelihood that similar data points are associated with the same bucket is, as shown in FIG. 5E, to use multiple hash tables 530 associated with different hash functions. In such a method, multiple hash functions (e.g., hash function families 582 and 584) can partition the same feature spaces in different yet overlapping manners (as denoted by the solid-line grid and dotted-line grid), such that the feature descriptors included in a query can lead to accessing of multiple buckets simultaneously covering a set of overlapping feature space areas simultaneously in different tables, and the search can be confined to the set of areas. Although the overlapping buckets allow better coverage of a partitioned feature space, it is possible that reference features that are not closest to the query features can be included in a bucket addressed by the query features, and additional filtering may need to be performed (e.g., by computing a distance between the reference features in the bucket and the query feature) to determine whether the reference features are to be included in the candidate image set.

Figure 5F:
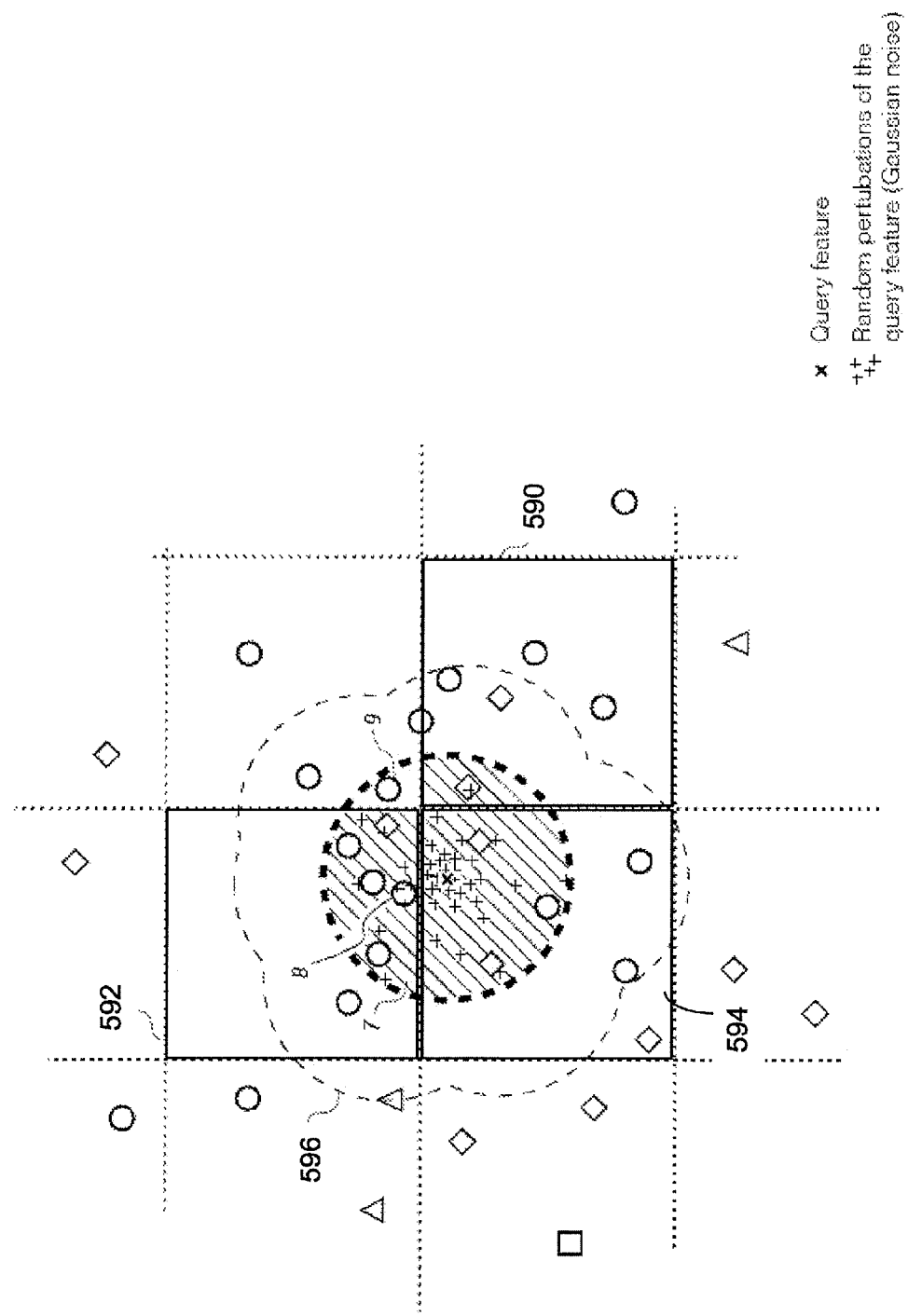
Figure 5G:
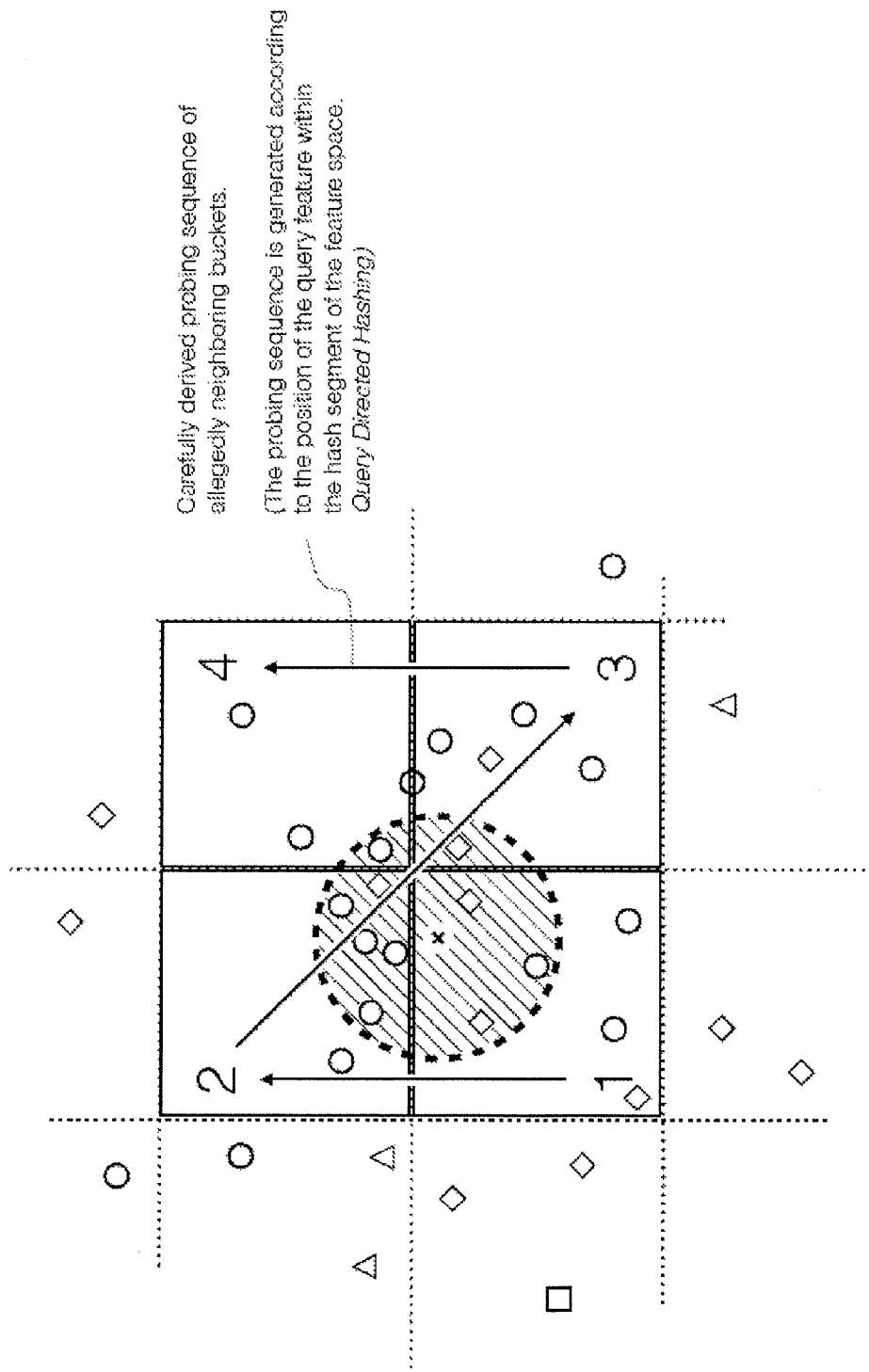

Another known technique for improving LSH, as shown in FIG. 5F, is using an entropy-based LSH to generate random data points near the query data point. These random data points can also cause the hash functions to map feature space areas 590, 592, and 594 into the same hash bucket. The similarity distance limit 596 for ANN search can also be expanded (relative to similarity distance limit 521 of FIG. 5A) to include the random data points. Moreover, as shown in FIG. 5G, multi-probe LSH can derive additional query points by employing a query derived probing sequence of allegedly neighboring buckets.

Figure 5H:
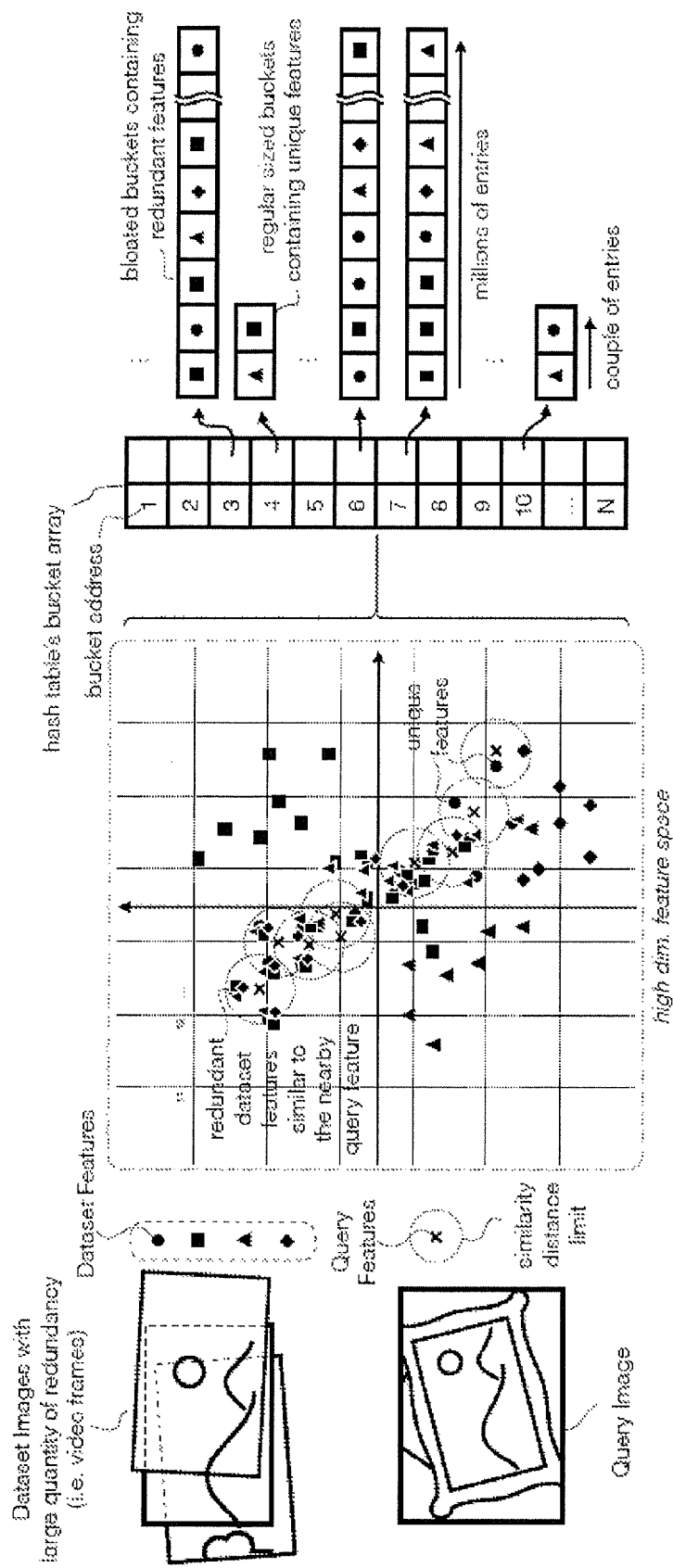

While the aforementioned LSH techniques can improve bucket coverage effect inherent to parameter space partitioning, there can be huge computational cost and storage requirement when the candidate images, whose feature descriptors are to be extracted and organized under hash table 510, are generated from a video. Because of the huge volume of data generated from a video, it can be very time-consuming and computationally intensive to examine each data point stored in any given bucket while performing the ANN search, which involves calculation of the actual distance between each data point in a hash bucket and the query data point. Moreover, as shown in FIG. 5H, video typically includes a large amount of repeated image content and, as a result, the vast majority of extracted image features may not contribute to any distinctive information, or can cause a minority of distinctive image features to be lost in the majority of less distinctive features, diluting any image match probability ranking that depends on feature presence. Besides, over-occupied hash buckets can also contribute disproportionally many data points to candidate feature descriptor sets and thwart performance gains for certain recurring image features, while consistent feature motions and transforms can diminish the ability of homographic alignment testing of feature correspondences to reliably identify matches.

Enhanced LSH

Methods and systems describing a modified technique of LSH will be provided in the following. The modified technique can be used to exploit the statistical coverage properties of the superposition of multiple well-chosen non-congruent hash functions as a coarse replacement distance metric. These methods and systems require fewer computations and less storage.

The described method eliminates the need of performing distance computations using the vector components of hash table stored data-points as in the aforementioned prior art implementations of LSH based ANN. The positional information hidden in multiple super-imposed non-congruent hash functions can be tapped directly, by interpreting the overlapping hash buckets as an irregular super-sampling of the continuous parameter space. Given the property of locality sensitive hashing, the probability of a hash bucket collision between samples $p_i$ and query sample q increases the closer they are. Interpreted reversely for a given set of L different locality sensitive hash functions, this implies that the D dimensional feature space area coverage of overlapping hash buckets within a similarity distance limit around a query point q increases for smaller radii ($R_1 < R_2$):

$$\frac{1}{R_1^D} \cdot \sum_{i=1}^{L} \int\int_{|p-q|<R_1} \cdots \int \delta(h_i(p), h_i(q)) \geq$$

$$\frac{1}{R_2^D} \cdot \sum_{i=0}^{L} \int\int_{|p'-q|<R_2} \cdots \int \delta(h_i(p'), h_i(q))$$

In other words, for a query point q the number of simultaneously overlapping hash buckets addressed by h(q) relates coarsely with the distance to the query point. This observation can be used directly as a quantized distance ranking metric:

$$R(p, q) = \sum_{i=1}^{L} \delta(h_i(q), h_i(p)) \sim -|p - q|$$

The closer a sample point $p_i$ comes to q, the higher is the probability that it's covered by some of the overlapping hash buckets selected by q and as a consequence the more frequently it shows up as a duplicate when collecting all points attached to the buckets. In a way, all spatial data point locations can be seen as lossy encoded or super-sampled within the bucket membership pattern of the hash tables itself. This encoding serves as a replacement for the data point locations.

The quality and resolution of this encoding is defined by the hash functions. First, the density of the overlapping buckets around a query point converges to a normal distribution (i.e., the more non-congruent hash functions are used, the finer the resolution gets):

$$\lim_{n\to\infty} \frac{1}{L} \sum_{i=1}^{L} \delta(h_i(\vec{q} + \vec{d} \cdot x), h_i(\vec{q})) = e^{-0.5 \frac{x^2}{\sigma_d^2}}$$

$$\vec{d} \in R^D \wedge \sigma \sim |\vec{d}|$$

Second, the absolute distance rank increases between closer samples and the rest (including noise). Only the data points p that lie within a distance corresponding to the largest bucket size to a query point q is subject to the aforementioned relationship between bucket coverage and distance:

$$\sum_{i=1}^{L} \delta(h_i(p), h_i(q)) - \sum_{i=1}^{L} \delta(h_i(r), h_i(q)) = \sum_{i=1}^{L} P(h_i(p) = h_i(q)) - L \cdot P_{collision}$$

for data points p, r: $|p-q|<R</|r-q|$

Those samples lying outside that large bucket size distance do not share the same bucket covered area, but may share buckets due to hash address collisions/bucket aliasing. For given ideal hash functions, these collisions are statistically distributed uniformly over the parameter space, and all samples that are not subject to the distance-rank-relation have the same fixed chance $P_{collision}$ to show up as false positives in the candidate set. The signal-to-noise gap can be adjusted either by increasing the number of hash functions, or by increasing the table size, effectively reducing the probability $P_{collision}$.

Figure 6A:
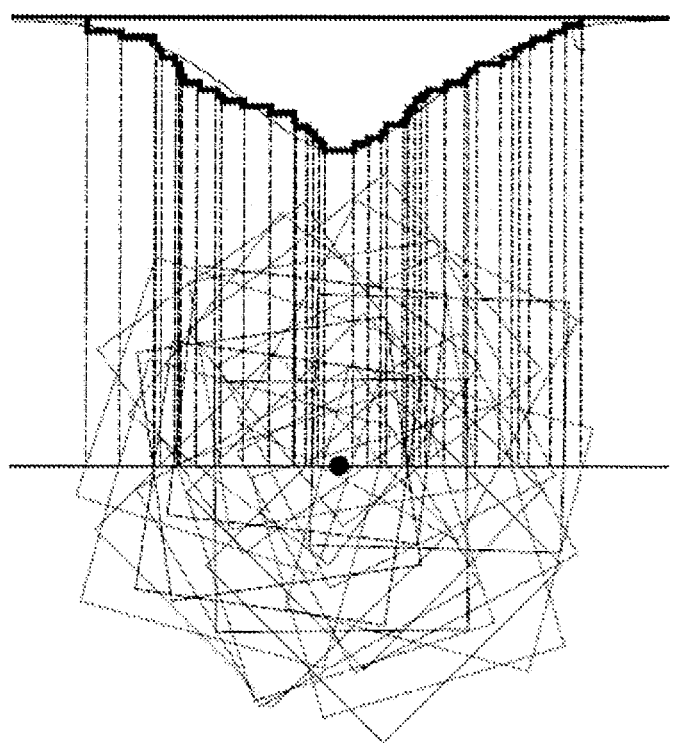
FIGS. 6A-6E are diagrams illustrating other exemplary methods for querying, organizing and accessing the Image Feature Index database, consistent with embodiments of the present disclosure.
Figure 6A:
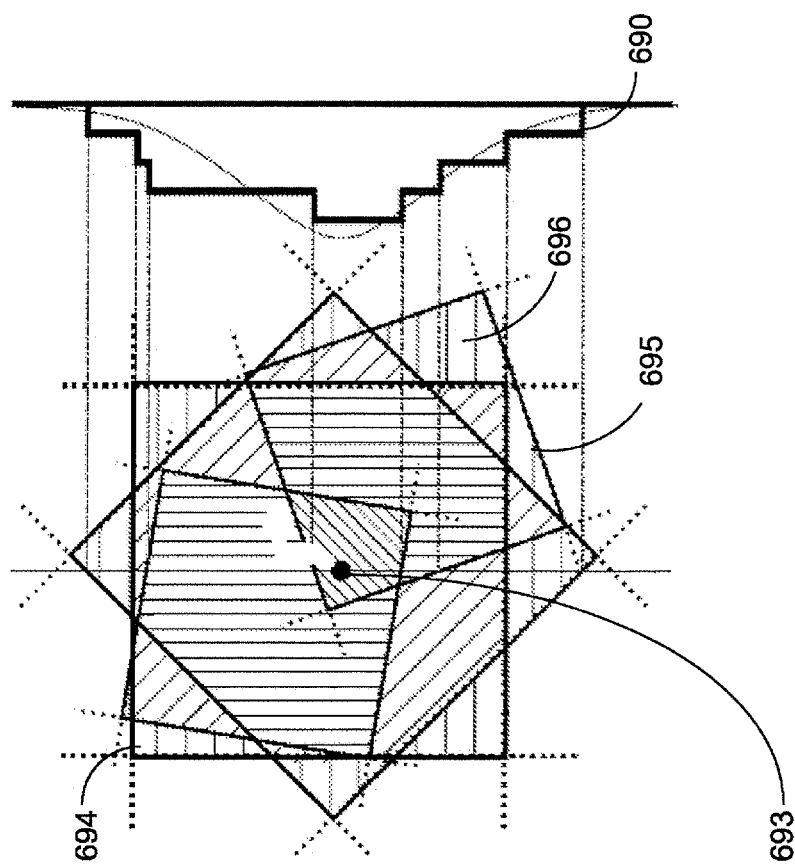

The effect of increasing the number of hash functions is illustrated in FIG. 6A. On the left, query feature data point 693 is addressed to a bucket space 694. A number of hash functions are used to partition bucket space 694, where each of hash-function addressed space (e.g. space 695) can overlap with data point 693. Data points within portion of space 695 that does not overlap with 694 (e.g. space 696) may still be collected as candidate data points (due to its association with a hash function whose addressed space 695 overlaps with the query data point). The density of overlapping buckets around the query point can be represented by a distribution 690. As shown on the right, as the number of hash functions increases, distribution 690 converges to become a Gaussian distribution. Due to the nature of a hash function, that is mapping an infinite parameter space to a finite set of buckets, data-points that lie outside all segments 694, 695, 696, addressed by query data point 693, may still fall into the same hash bucket. Assuming ideal hash functions, these so called bucket collisions appear as uniform noise, since they are not subject to the locality sensitivity property.

Figure 6B:
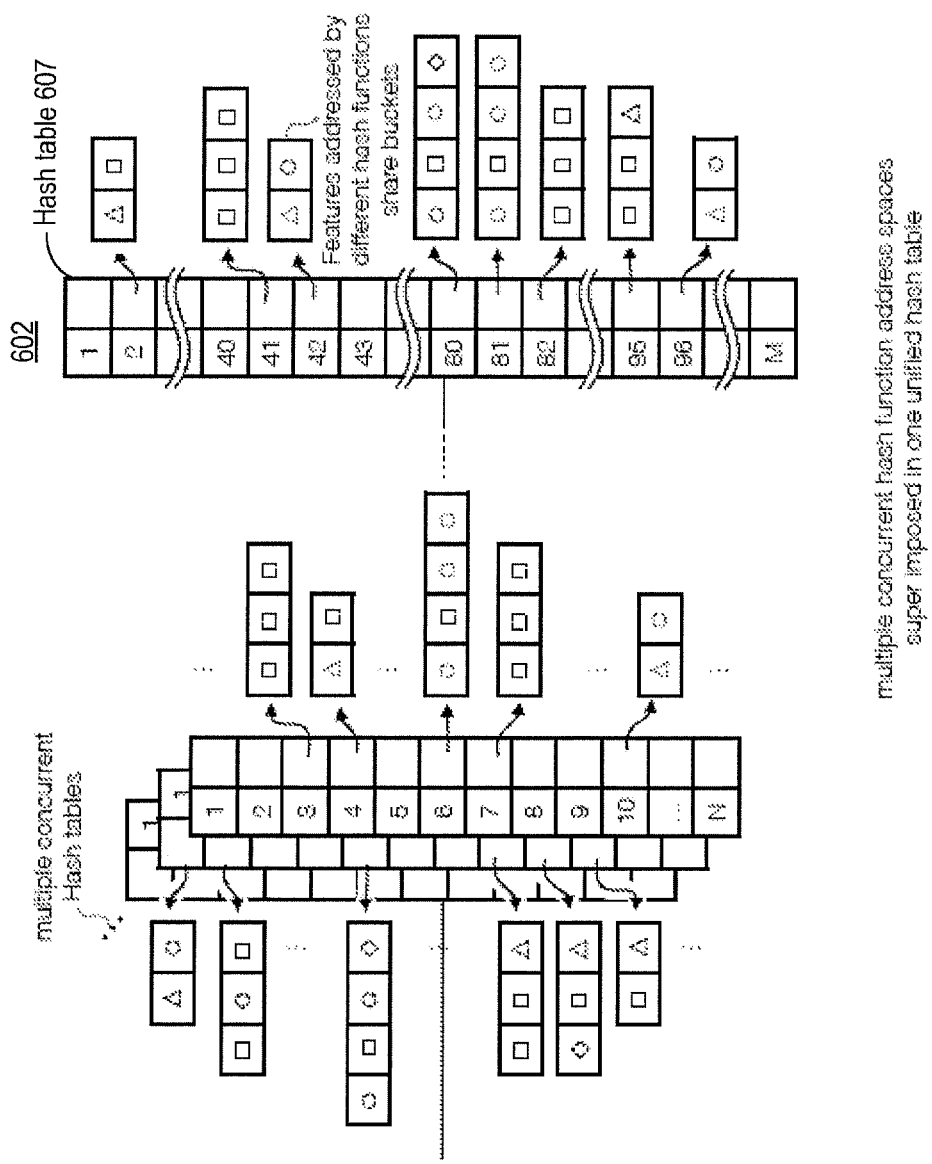
Figure 6C:
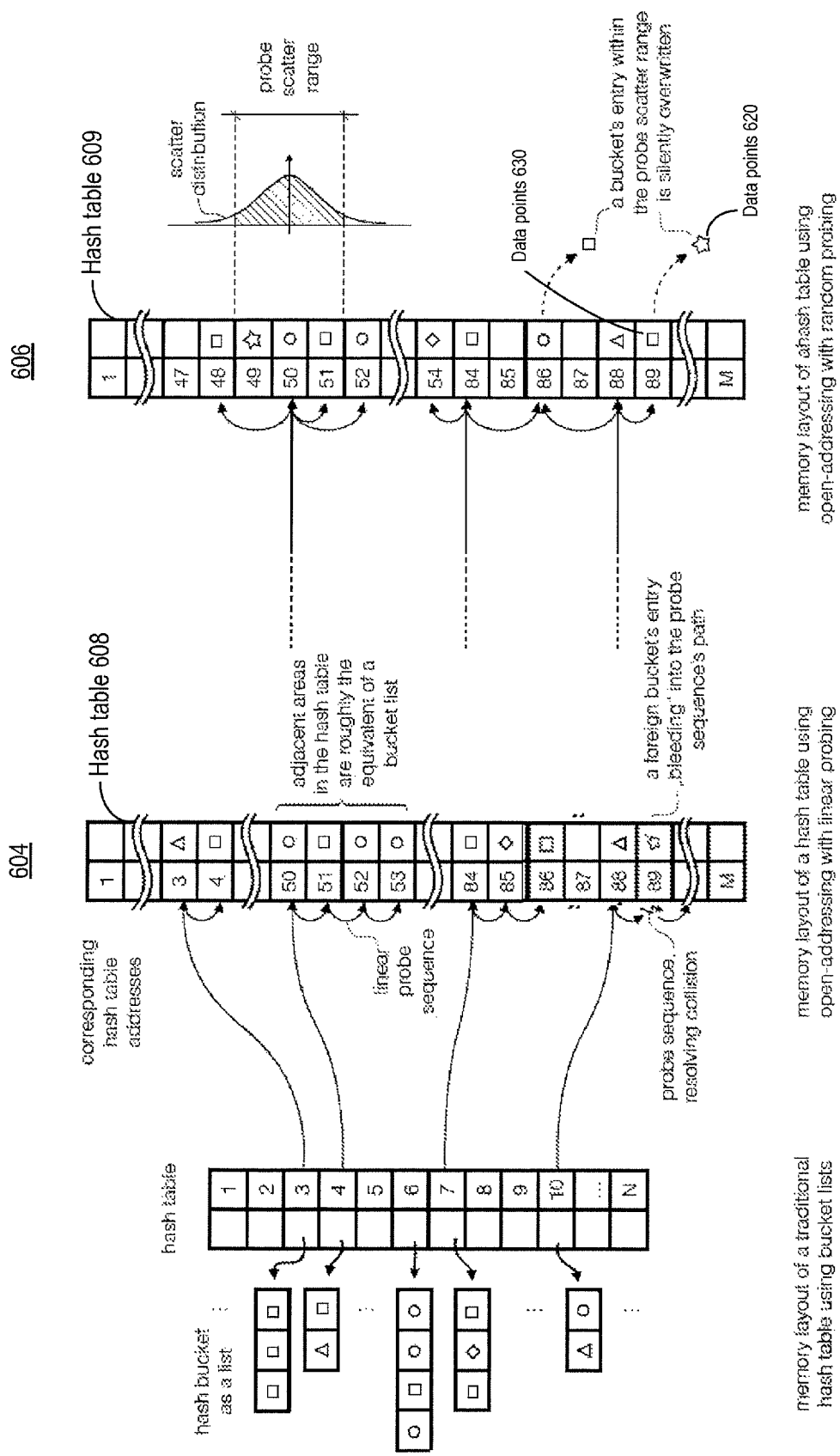

FIG. 6B-C shows exemplary methods 602, 604, and 606 for organizing the search data structure that further exploits the probabilistic nature of the aforementioned distance rank metric. In some embodiments, as shown in FIG. 6B, multiple concurrent hash function address spaces can be superimposed in one unified hash table 607, where the hash indexes from the hash families are mapped to one set of hash buckets, allowing multiple hash functions to address the same hash bucket, with each hash bucket storing a list of elements. Moreover, hash tables 608 and 609 of FIG. 6C illustrate a novel-storage approach of using a modified open-addressing hash table layout, where a bucket has always either zero or one elements. To resolve hash collisions (i.e., multiple hash functions pointing to the same bucket), an open-addressing method can be employed. As shown by method 604 of FIG. 6C, when a feature data point is to be written to a bucket addressed at 3, which already stores data. The hash table can be probed for empty bucket according to a linear probing sequence. In this illustrative example, the hash table will be traversed in a linear fashion (e.g., traversing buckets that are consecutively addressed). When a hash table address is calculated for a query feature data point, all elements starting from the calculated hash table address until an empty bucket is reached will be included in the candidate data points. Candidate feature data points collected along the probe sequence can be filtered using distance comparison, where only those feature data points that are within a predefined similarity distance to the query feature data points are retained.

In some embodiments, as shown in method 606 of FIG. 6C, instead of linear probing, a probabilistic local probing can be used for resolving hash collision by randomly scattering inserted data points in buckets within a predefined range around the bucket originally addressed by the data points, and also no probing sequence is tracked. Moreover, no filtering using distance comparison is performed, and the feature's vector components, which are used for hash address calculation, do not need to be stored.

Since the aforementioned probabilistic distance metric uses occurrence of feature data points as distance indicator, candidate data points that are collected within a bucket but originate from different hash addresses can appear as noise that is statistically distributed over the feature space, when later retrieved as a result of query. As described below, these data points can be differentiated from the correctly collected data points based on a number of occurrences of these data points within a block of bucket entries. For example, images that have been referenced equal or less than the hash table intrinsic noise-level may be discarded (see, for example, step 616 of FIG. 6D). The noise can be mitigated (precisely steered) by, for example, increasing the size of hash tables, increasing the number of hash functions, etc.

Moreover, as shown in FIG. 6C, under method 606, an entry can be overwritten by more recent data. For example, bucket addressed at 89 used to store data points 620, but as a result of probabilistic local probing, it is overwritten by data points 630. Since typically data points that are associated with over-occupied buckets come from voluminous yet less distinctive features, the overwriting of these data allow these features to be blurred out, and their influences to determining the matching features can be reduced. This overwriting policy can also be adjusted to handle the overflowing situation (i.e., when all the entries in the hash table are stored with data).

With a hash table arranged according to, for example, hash tables 607-609 of FIG. 6B-C, adjacent areas in the hash table are roughly the equivalent of a bucket list. Accordingly, for each hash address calculated from a feature data point, a fixed-size block read of the hash table around the hash address can be performed using, for example, paging functionality commonly employed in memory-mapped file accessing. Each block being read in this manner can represent a bucket list, which in turn represents an overlapped bucket oversampling feature space area partitioned by the hash function. As explained above, the number of simultaneously overlapping hash buckets addressed by a query data point (i.e., the hash buckets that are associated address calculated by applying the hash functions to the query data point) relates coarsely with the distance of the query data point, such that the closer a particular data point in the bucket comes to the query data point, the higher is the probability of that particular data point being covered by at least some of the overlapping hash buckets addressed by the query data point. As a result, that particular data point can show up more frequently as a duplicate within the overlapping hash buckets (i.e., hash buckets mapped to overlapped feature space area), and the number of occurrence of that particular data point within the overlapping hash buckets (represented by the block read) can be used to estimate its distance from the query data point. Those data points that occur most frequently within the block can then be determined to be the matching features in response to the query, and included in the candidate data points. From the candidate data points, the images associated with the candidate data points can be acquired as candidate images.

Figure 6D:
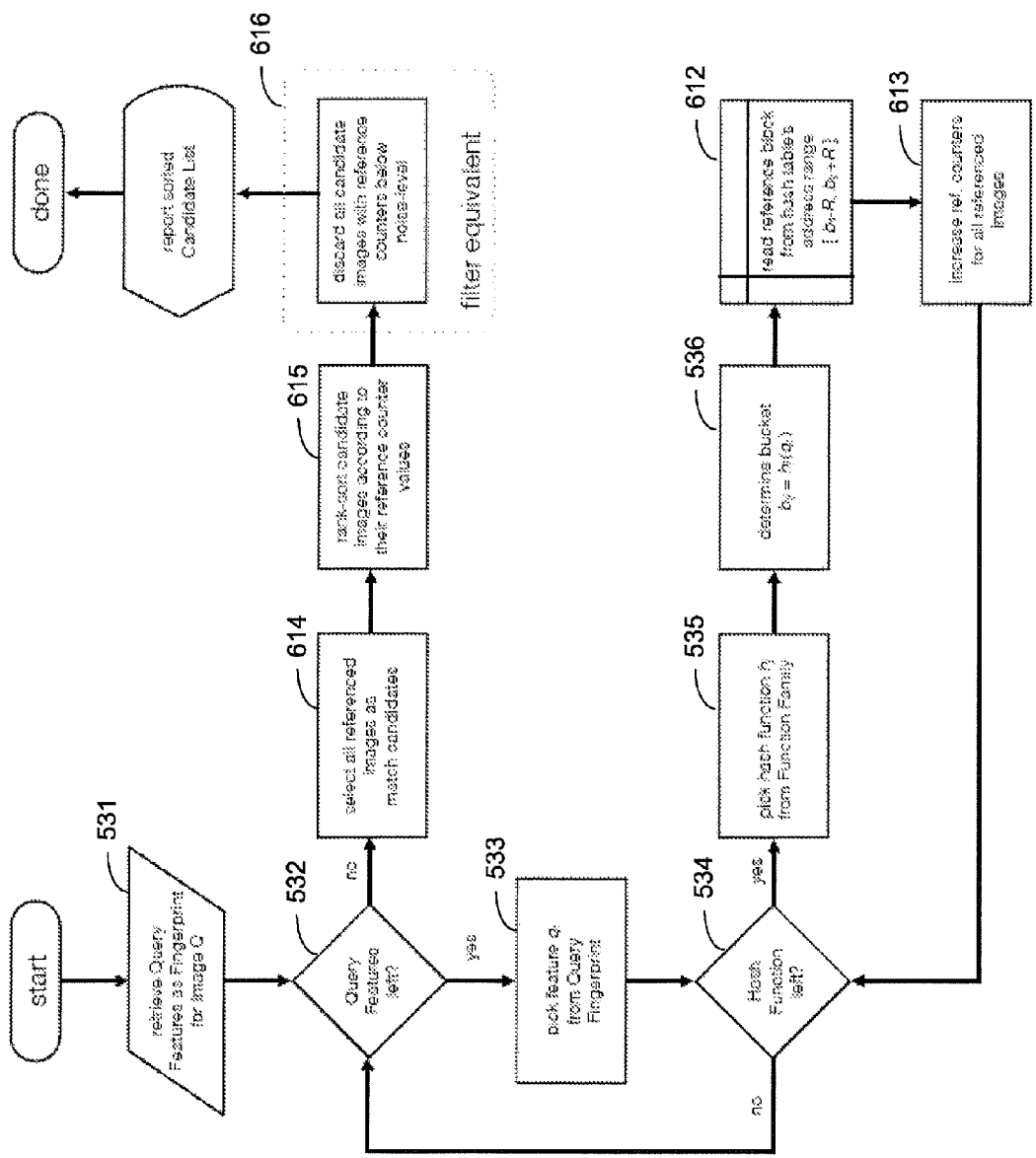

FIG. 6D illustrates an exemplary method for performing the query process to an Image Feature Index database, with the database organized using, for example, hash table 609 of FIG. 6C. Steps 532-536 are the same as those in FIG. 5B and their descriptions are not repeated here. After the bucket address is determined in step 536, a block read of the hash table around that bucket, as described above with reference to FIG. 6C, is performed in step 612. Each duplicate reference feature data point collected is then counted by, for example, keeping track of a reference counter associated with each reference feature data point in step 613. After all the query data points are analyzed, the candidate images associated with the collected reference feature data points are selected as matching candidates in step 614. Each candidate image can be associated with a combination of reference counters associated with each duplicate reference feature data points as determined in step 613. The combination of the reference counters can then be used to rank and sort the candidate images in step 615. In step 616, candidate images with some reference counters that are above a certain threshold can be discarded. Such a threshold can be determined based on a predetermined noise level.

Figure 6E:
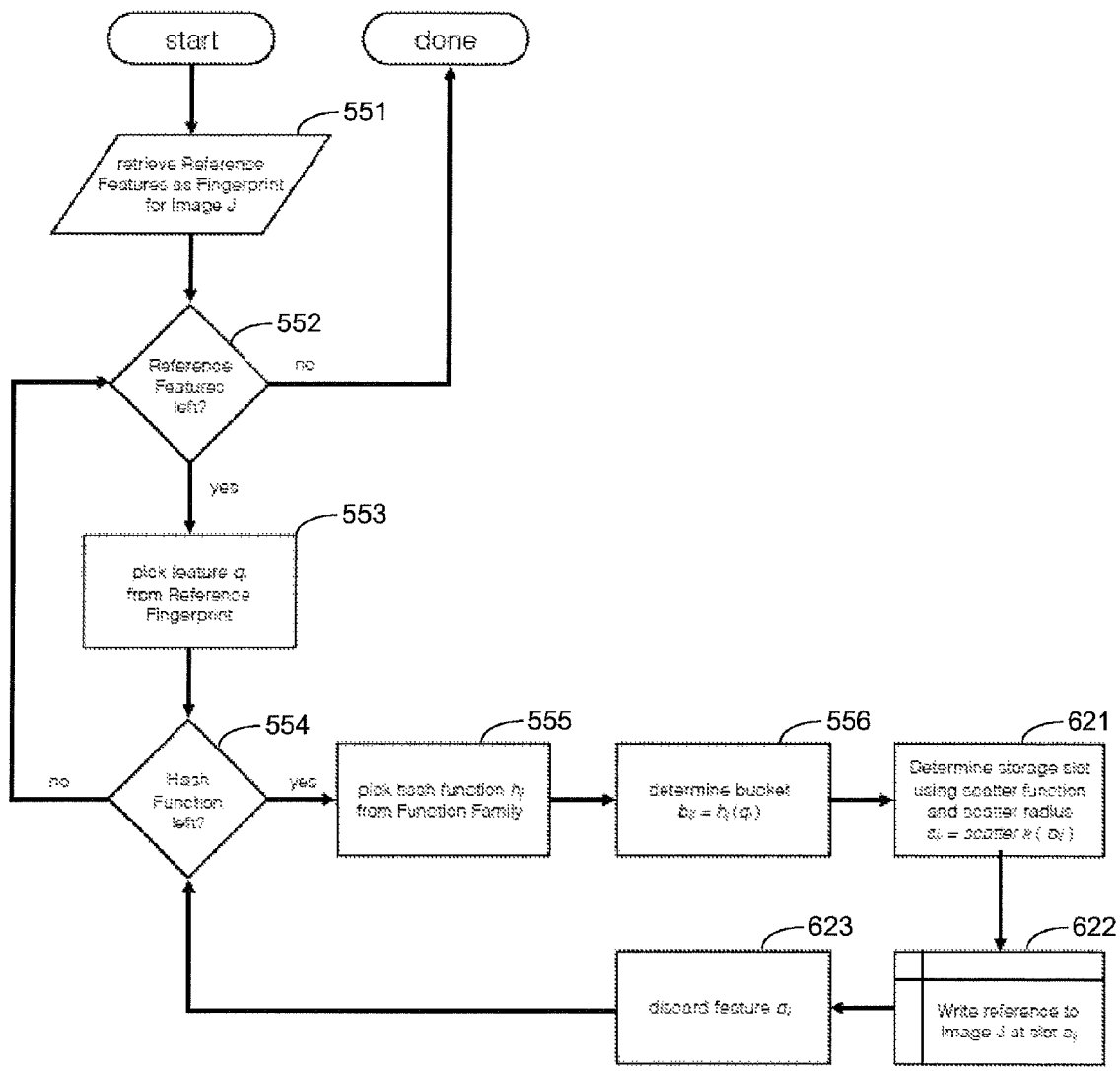

FIG. 6E illustrates a method for inserting a reference image into an image feature index database as described before. Steps 551-556 are the same as similarly-numbered steps of FIG. 5C, and their description is not repeated here. In step 621, after a first bucket address is determined for the reference feature quantity, a random function is used to calculate a second bucket address. The random function can be used to randomly scatter inserted data points in buckets within a predefined range around the bucket originally addressed by the data points, similar to method 602 of FIG. 6B. The reference data point will then be stored at a bucket addressed by the second address, in step 622. If there are other older data being stored in that bucket, that data will be discarded in favor of the reference data point, in step 623.

Figure 7:
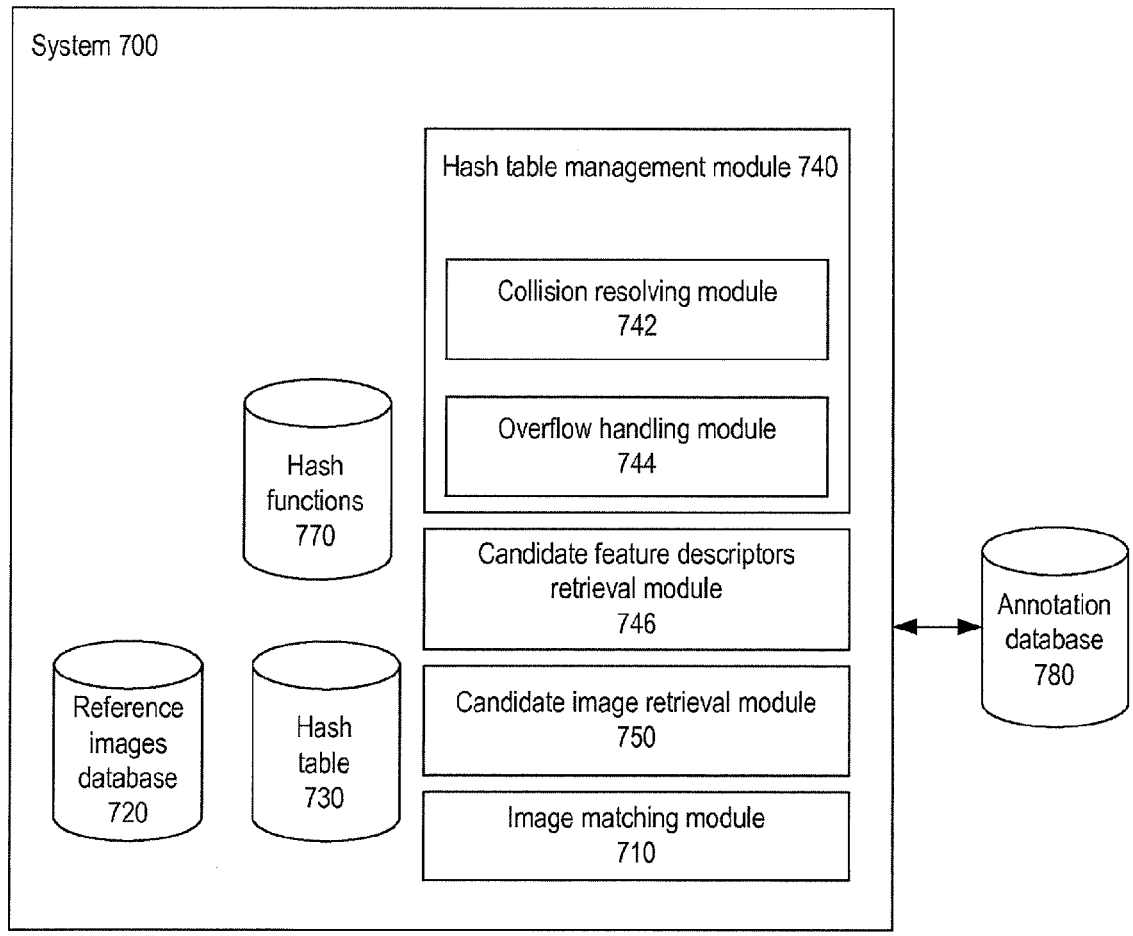
FIG. 7 is a block diagram illustrating an exemplary system for processing image fingerprints, consistent with embodiments of the present disclosure.

FIG. 7 is a block diagram illustrating an exemplary system 700 with which embodiments described herein can be implemented, consistent with embodiments of the present disclosure. In some embodiments, system 700 can be part of server 140 of FIG. 1A. In some embodiments, system 700 can be used to process a query sent by, for example, system 300 of FIG. 3. In at least one exemplary embodiment, system 700 comprises image matching module 752, reference images database 720, hash table 730, hash table management module 740, candidate feature descriptors retrieval module 746, candidate image retrieval module 750, and hash functions 770.

In at least some exemplary embodiments, image matching module 752 is image matching module 142 as described above with respect to FIG. 1A.

Reference images database 720 can store a set of candidate images. Each candidate image can be an image of visual media (e.g., a screenshot of a scene during a TV show), and can include a set of pre-determined visual features. These visual features can be pre-determined to be highly likely to be included in a query to be processed by system 700. These features can be represented by the aforementioned feature descriptors. Each reference image can then be associated with one or more feature descriptors corresponding to at least some of the set of pre-determined visual features included in the image. When a query including a set of feature descriptors is received, one or more candidate images can be retrieved from reference images database 720 in response to a query based on a determination that the feature descriptors included the retrieved candidate images match with at least some of feature descriptors included in the fingerprint of the query, with a certain degree of certainty. In some embodiments, those retrieved candidate images can then be compared with the query image (i.e., the image from which the query is generated) to find the best matching candidate image.

Although a database of reference images is presented here, it should be understood that there are other ways of grouping visual features in a database (e.g., associating a combination of visual features or feature descriptors with a particular object, instead of a candidate image), which are fully applicable to the techniques disclosed herein and are within the scope of the present disclosure.

Hash table 730 is associated with a set of hash functions 770. In some embodiments, hash table management module 740 further includes a collision resolving module 742 and an overflow handling module 744.

In some embodiments, hash table management module 740, candidate feature descriptors retrieval module 746, and candidate images retrieval module 750 can be configured to implement the processing of query as disclosed in FIG.-6D-E. Hash table management module 740 provides access to hash table 730 in response to a query. Hash table management module 340 provides a mapping table that maps the hash indexes (i.e. the addresses) of all the hash tables included in hash table 730 to one set of hash buckets, similar to unified hash tables 602,604 and 606 of FIG. 6B-C. The addresses are calculated based on the feature descriptor data points using hash functions 770.

Collision resolving module 742, which is part of hash table management module 740, handles hash collision (i.e., when two different data points are addressed to the same bucket) when associating a new data point (e.g., a set of feature descriptors) with hash table 730. In some embodiments, collision resolving module 742 implements the open-addressing and probing methods as described before in reference to FIGS. 6C and 6E.

Overflow handling module 744, which is part of hash table management module 740, handles the association of a new data point (e.g., a set of feature descriptors) with hash table 730 in the case that no empty slot can be found in the hash table. In some embodiments, overflow handling module 744 implements the overwriting policy as described before in reference to FIGS. 6C and 6E.

Candidate feature descriptors retrieval module 746 accesses hash table 730 to acquire a set of candidate feature descriptors data points. For each feature descriptor included in a query, candidate feature descriptors retrieval module 746 applies the hash functions to calculate the addresses, uses the addresses to locate the buckets, and then retrieves all the data points associated with the buckets. In the case where a probing sequence is not tracked, all the data points associated with other buckets along the probing sequence will be retrieved as well. In the case where probabilistic local probing is used, all the data points within the predefined range around the bucket addressed will also be retrieved. After the candidate feature descriptors data points are retrieved, the data points are then sent to candidate images retrieval module 750, which can then determine which set of the feature descriptors data points repeats the most frequently within the set of candidate data points. These feature descriptors will be determined to be the most similar to the feature descriptors included in the query, and can then be used to identify a set of candidate images or other additional information in response to the query. In some embodiments, candidate feature descriptors retrieval module 746 and candidate images retrieval module 750 implement at least part of methods of FIGS. 6D and 6E.

After receiving the candidate image, image matching module 752 then compares the fingerprints of the candidate images to the query fingerprint (or portion thereof), and determines if there is a match. If there is a match, it then system 700 retrieves the matching image along with annotations attached to it from the annotations database 780, and returns the additional information and annotations to the mobile device.

Figure 8:
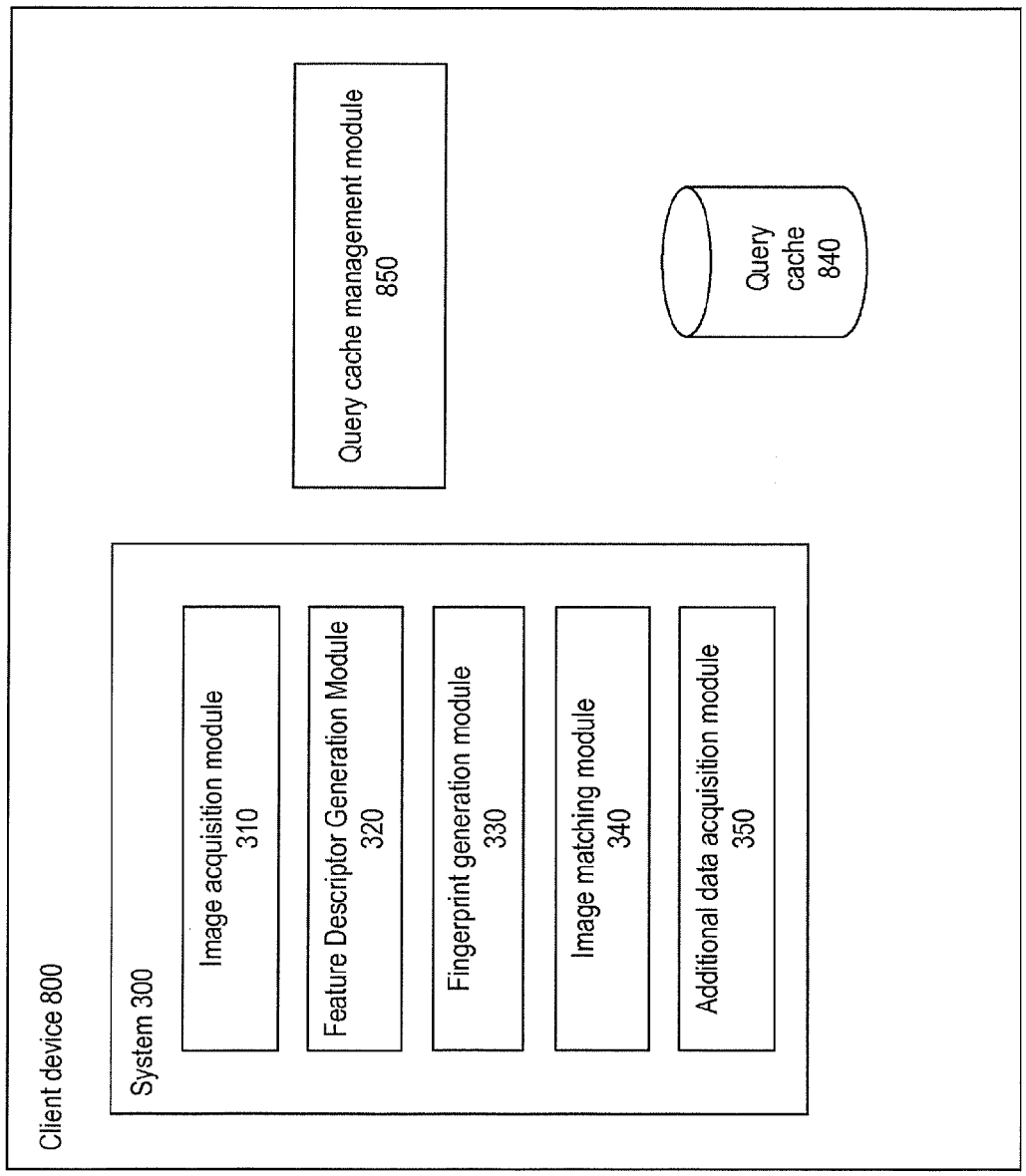
FIG. 8 is a block diagram illustrating another exemplary system for processing image fingerprints, consistent with embodiments of the present disclosure.

In some embodiments, as shown in FIG. 8, an exemplary client device 800 can include, in addition to system 300 of FIG. 3, a query cache 840 and query cache management module 850, to form a two-tier system for query processing. Query cache 840 can store a mapping between previously-received queries and the feature descriptors (and/or candidate image(s)) retrieved from server 140 in response to those queries, employ a method similar to as described in FIG. 4C. When a new query is received, query cache management module 850 can compare the content of the new query with the content of the queries stored in query cache 800. If a match is found in query cache 840, the associated feature descriptors (and/or candidate image(s)) can be provided as a response without sending the query to server 130. If a match cannot be found in query cache 840 and/or the candidate images database 820, the query will then be transmitted to system 700.

In some embodiments, such a two-tier system can also be implemented between two different servers, or as part of system 700, to handle queries originated from different client devices but include similar content. After a first client device submits a first query which causes server 130 to retrieve a matching image, another client device may submit a second query which includes similar content. In that case, the second query can be handled by searching through query cache 840, and the result to the first query can be reused. Such an arrangement can be useful to handle spikes in queries with similar content. For example, as described before, when a video is being broadcasted to millions of viewers, many of them may submit a query by taking a snapshot of an item of interest that appears simultaneously on their display devices, and these queries can include very similar content. After the first query is processed by accessing the much larger reference images database 720 and the result is added to query cache 840, the other queries including the same item of interest can then be handled by accessing the query cache 840 instead, which can improve efficiency enormously.

FIG. 9 is a block diagram of an exemplary system 900 with which embodiments described herein can be implemented, consistent with embodiments of the present disclosure. As shown in FIG. 9, system 900 includes a client device 910, a network 930, and a server 940. Client device 910 includes one or more processors 912, a memory device 914, a storage device 916, a display 917, a network interface 918, a camera 119 (or other image generation device), and an accelerometer 922 (or other orientation determination device), all of which can communicate with each other via a bus 920. In some embodiments, display 917 is preferably a touchscreen. The I/O devices can include a microphone and any other devices that can acquire and/or output a signal. Through network 930, client device 910 can exchange data with a server 940. Server 940 also includes one or more processors 942, a memory device 944, a storage device 946, and a network interface 948, all of which can communicate with each other via a bus 950.

Both memories 914 and 944 can be a random access memory (RAM) or other volatile storage devices for storing information and instructions to be executed by, respectively, processors 912 and 942. Memories 914 and 944 also can be used for storing temporary variables or other intermediate information during execution of instructions to be executed by processors 912 and 942. Such instructions, after being stored in non-transitory storage media accessible to processors 912 and 914 (e.g., storage devices 916 and 946), render computer systems 910 and 940 into special-purpose machines that are customized to perform the operations specified in the instructions. The instructions can be organized into different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Client device 910 and server 940 can implement the techniques described herein using customized hard-wired logic, one or more ASICs or FPGAs, firmware and/or program logic which in combination with the computer system causes or programs client device 910 and server 940 to be a special-purpose machine. According to some embodiments, the operations, functionalities, and techniques and other features described herein are performed by client device 940 and server 940 in response to processors 912 and 942 executing one or more sequences of one or more instructions contained in, respectively, memories 914 and 944. Such instructions can be read into memories 914 and 944 from another storage medium, such as storage devices 916 and 946. Execution of the sequences of instructions contained in memories 914 and 944 cause respectively processors 912 and 942 to perform the process steps described herein. In alternative embodiments, hard-wired circuitry can be used in place of or in combination with software instructions.

The term "non-transitory media" as used herein refers to any non-transitory media for storing data and/or instructions that cause a machine to operate in a specific fashion. Such non-transitory media can comprise non-volatile media and/or volatile media. Non-volatile media can include, for example, optical or magnetic devices, such as storage devices 916 and 946. Volatile media can include dynamic memory, such as memories 914 and 944. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

For example, devices 121 and 122 of FIG. 1A can be implemented as client device 910, where system 300 of FIG. 3 and methods 400, 430, and 460 of FIGS. 4A-4B can be implemented as software instructions stored in storage 916 and memory 914. In some embodiments, server 140 of FIG. 1A can be implemented as server 940, where system 700 of FIG. 7 and methods 600, 602, 610 and 620 of FIGS. 6B-6D can be implemented as software instructions stored in storage 946 and memory 944.

Network interfaces 918 and 948 can provide a two-way data communication coupling to network 930. For example, network interfaces 918 and 948 can be an integrated services digital network (ISDN) card, cable modem, satellite modem, or a modem to provide a data communication connection to a corresponding type of telephone line. As another example, network interfaces 918 and 948 can be a local area network (LAN) card to provide a data communication connection to a compatible LAN. Wireless links can also be implemented. In any such implementation, network interfaces 918 and 948 can send and receive electrical, electromagnetic or optical signals that carry digital data streams representing various types of information, and provide the data stream to storage devices 916 and 946. Processors 912 and 942 can then convert the data into a different form (e.g., by executing software instructions to compress or decompress the data), and then store the converted data into the storage devices (e.g., storage devices 916 and 946), and/or transmit the converted data via network interfaces 918 and 948 over network 930.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

The aforementioned systems described herein have many uses and may be used in a variety of scenarios. For example, the methods and systems described herein may be used in systems for delivering advertising to a user of a mobile device. For example, a user can identify an item, topic, scenery, or location of interest while visiting a place, reading a publication, or watching a movie. Using the inventive systems and methods herein, the user can take a snapshot of the item, the scenery, or anything of interest, and generate an image. The image can be captured including surrounding area and at any view angle. The system then extracts features from the image, generates a query including feature descriptors corresponding to at least some of the images, and submits the query for a search based on the extracted features to a remote server. The additional information that may be displayed to the user can be provided for free to the user, or some or all of the information may be in the form of paid advertising. In some scenarios, one entity may provide the search service and charge vendors for sending the additional information about products or services that are sent to users. In some scenarios, mobile device users may be charged for the ability to retrieve information on products or services using the aforementioned methods and systems.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

We claim:

1. A server for determining information relating to an image captured by a mobile device, the server comprising a processor for executing one or more modules comprising:
   a query receiving module for receiving, from the mobile device, a query including a plurality of query image feature descriptors associated with the captured image;
   a candidate feature descriptors retrieval module for:
      determining, for at least one of the query image feature descriptors, a plurality of first addresses using a plurality of functions, and
      determining, within an address space associated with the plurality of first addresses at a reference image database, a number of duplicate reference image feature descriptors, wherein a plurality of duplicates of at least one reference image feature descriptor is mapped using the plurality of functions to at least one second address at the reference image database;
   a candidate images retrieval module for selecting one or more reference image feature descriptors based on the determined number of duplicate reference image feature descriptors;
   wherein, based on the selected reference image feature descriptors, the server is further configured to perform the steps of:
      determining information associated with the selected reference image feature descriptors, and
      providing the information associated with the selected reference image feature descriptors to the mobile device.

2. The server of claim 1, wherein the processor is further configured to execute a hash table management module for:
   providing, for each of the plurality of first addresses, one or more references to one or more of the reference image feature descriptors based on a relationship between each of the plurality of first addresses and the least one second address;
   and wherein the number of duplicate reference image feature descriptors is determined based on the relationship.

3. The server of claim 2, wherein the hash table management module further comprises a collision resolving module for:
   using a random function to calculate the at least one second address.

4. The server of claim 2, wherein the hash table management module further comprises an overflowing handling module for:
   determining whether the at least one second address is associated with a first reference image feature descriptor when the at least one second address is calculated;
   responsive to determining that the at least one second address is associated with the first reference image feature descriptor:
      disassociating the at least one second address from the first reference image feature descriptor; and
      associating the at least one second address with a second reference image feature descriptor.

5. The server of claim 1, wherein the processor is further configured to execute the candidate images retrieval module for:
   ranking one or more sets of reference image descriptors, each set being associated with a combination of the determined numbers of duplicate reference image feature descriptors; and
   selecting the set of reference image feature descriptors based on a result of the ranking.

6. The server of claim 1, wherein the processor is further configured to execute the candidate images retrieval module for:
   excluding, from the selection of the one or more reference image feature descriptors, reference image feature descriptors associated with a calculated number of duplicate reference image feature descriptors that is below a predefined threshold.

7. The server of claim 1, wherein the reference image descriptors are stored within the reference image database based on a hash table including a plurality of hash buckets, each hash bucket being associated with an address within the address space; wherein the plurality of functions are configured to map one or more feature descriptors to one or more hash buckets out of the same set of hash buckets.

8. The server of claim 1, wherein the processor is further configured to execute a replicable query cache module for:
   determining whether the query image feature descriptors included in the query matches with one or more prior query image feature descriptors received at a prior time;
   if the query feature descriptors included in the query do not match with the one or more prior query image feature descriptors:
      storing the query feature descriptors as part of the one or more prior query image feature descriptors, and providing the query feature descriptors to the candidate feature descriptors retrieval module; and if the query feature descriptors included in the query matches with the one or more prior query image feature descriptors, providing information associated with the matching one or more prior query image feature descriptors to the mobile device.

9. The server of claim 1, wherein the processor is further configured to perform the steps of:

receiving data associated with media material through an interface; and providing the data to the mobile device as part of the information associated with the selected reference image feature descriptors.

10. A computer-implemented method for determining information relating to an image captured by a mobile device, the method comprising:

receiving, from the mobile device, a query including a plurality of query image feature descriptors associated with the captured image;

determining, for at least one of the query image feature descriptors, a plurality of first addresses using a plurality of functions;

determining, within an address space associated with the plurality of first addresses at a reference image database, a number of duplicate reference image feature descriptors, wherein a plurality of duplicates of at least one reference image feature descriptor is mapped using the plurality of functions to at least a second address at the reference image database;

selecting one or more reference image feature descriptors based on the determined number of duplicate reference image feature descriptors;

determining information associated with the selected reference image feature descriptors; and providing the information associated with the selected reference image feature descriptors to the mobile device.

11. The method of claim 10, further comprising:

providing, for each of the plurality of first addresses, one or more references to one or more of the reference image feature descriptors based on a relationship between each of the plurality of first addresses and the least one second address;

and wherein the number of duplicate reference image feature descriptors is determined based on the relationship.

12. The method of claim 11, further comprising:

using a random function to calculate the at least one second address.

13. The method of claim 11, further comprising:

determining whether the at least one second address is associated with a first reference image feature descriptor when the at least one second address is calculated;

responsive to determining that the at least one first address is associated with the first reference image feature descriptor:

disassociating the at least one first address from the first reference image feature descriptor; and associating the at least one first address with a second reference image feature descriptor.

14. The method of claim 10, further comprising:

ranking one or more sets of reference image descriptors, each set being associated with a combination of the determined numbers of duplicate reference image feature descriptors; and selecting the set of reference image feature descriptors based on a result of the ranking.

15. The method of claim 10, further comprising:

excluding, from the selection of the one or more reference image feature descriptors, reference image feature descriptors associated with a calculated number of duplicate reference image feature descriptors that is below a predefined threshold.

16. The method of claim 10, wherein the reference image descriptors are stored within the reference image database based on a hash table including a plurality of hash buckets, each hash bucket being associated with an address within the address space; wherein the plurality of functions are configured to map one or more feature descriptors to one or more hash buckets out of the same set of hash buckets.

17. The method of claim 10, further comprising:

determining whether the query image feature descriptors included in the query matches with one or more prior query image feature descriptors received at a prior time;

if the query feature descriptors included in the query do not match with the one or more prior query image feature descriptors:

storing the query feature descriptors as part of the one or more prior query image feature descriptors, and providing the query feature descriptors to the candidate feature descriptors retrieval module;

and if the query feature descriptors included in the query matches with the one or more prior query image feature descriptors, providing information associated with the matching one or more prior query image feature descriptors to the mobile device.

18. The method of claim 10, further comprising:

receiving data associated with media material through an interface; and providing the data to the mobile device as part of the information associated with the selected reference image feature descriptors.

19. A non-transitory computer-readable storage medium having stored thereon a program containing instructions that, when executed by a computer, cause the computer to execute a method for determining information relating to an image captured by a mobile device, the method comprising:

receiving, from the mobile device, a query including a plurality of query image feature descriptors associated with the captured image;

determining, for at least one of the query image feature descriptors, a plurality of first addresses using a plurality of functions;

determining, within an address space associated with the plurality of first addresses at a reference image database, a number of duplicate reference image feature descriptors, wherein a plurality of duplicates of at least one reference image feature descriptor is mapped using the plurality of functions to at least a second address at the reference image database;

selecting one or more reference image feature descriptors based on the determined number of duplicate reference image feature descriptors;

determining information associated with the selected reference image feature descriptors; and providing the information associated with the selected reference image feature descriptors to the mobile device.

* * * * *